United States Patent
Lokesharadhya et al.

(10) Patent No.: US 12,169,727 B2
(45) Date of Patent: Dec. 17, 2024

(54) SYSTEMS AND METHODS TO IMPROVE APPLICATION PERFORMANCE

(71) Applicant: Citrix Systems, Inc., Fort Lauderdale, FL (US)

(72) Inventors: Ajay Bukkapattana Lokesharadhya, Bengaluru (IN); Prabhjeet Singh Chawla, Bengaluru (IN); Syed Mansoor Pasha, Bengaluru (IN)

(*) Notice: Subject to any disclaimer, the term of this patent is extended or adjusted under 35 U.S.C. 154(b) by 448 days.

(21) Appl. No.: 17/147,140

(22) Filed: Jan. 12, 2021

(65) Prior Publication Data

US 2022/0222097 A1    Jul. 14, 2022

(51) Int. Cl.
G06F 9/455    (2018.01)
G06F 9/50    (2006.01)
G06F 11/14    (2006.01)
G06F 11/34    (2006.01)

(52) U.S. Cl.
CPC ........ *G06F 9/45558* (2013.01); *G06F 9/5083* (2013.01); *G06F 11/1484* (2013.01); *G06F 11/3433* (2013.01); *G06F 2009/45562* (2013.01); *G06F 2009/4557* (2013.01); *G06F 2009/45591* (2013.01); *G06F 2201/815* (2013.01); *G06F 2209/5022* (2013.01)

(58) Field of Classification Search
CPC ............... G06F 9/45558; G06F 9/5083; G06F 11/1484; G06F 11/3433; G06F 2009/45562; G06F 2009/4557; G06F 2009/45591; G06F 2201/815; G06F 2209/5022; G06F 11/004; G06F 11/0754; G06F 2201/81; G06F 9/5088; G06F 11/301; G06F 11/0712; G06F 2209/5011; G06F 9/5077
See application file for complete search history.

(56) References Cited

U.S. PATENT DOCUMENTS

| | | | |
|---|---|---|---|
| 10,725,885 B1* | 7/2020 | Paraschiv | G06F 11/3433 |
| 2011/0161957 A1 | 6/2011 | Bernardi et al. | |
| 2014/0282540 A1* | 9/2014 | Bonnet | G06F 9/45558 |
| | | | 718/1 |
| 2019/0129788 A1* | 5/2019 | Fields | G06F 11/006 |
| 2020/0034168 A1 | 1/2020 | Singleton, IV | |

(Continued)

OTHER PUBLICATIONS

International Search Report and Written Opinion on PCT Appl. No. PCT/US2022/011030 mailed May 6, 2022.

(Continued)

*Primary Examiner* — Jorge A Chu Joy-Davila

(57) ABSTRACT

Described embodiments provide systems and method for determining action insights to address, correct or fix application failures. A device can identify an assignment of a user to a virtual machine and the assignment can enable launch of an application with use of the same virtual machine on behalf of the user. The virtual machine can be one of a delivery group of virtual machines. A threshold can be determined for the virtual machine that indicates a likely failure of the virtual machine to launch the application based data about performance of the delivery group. The device can modify the assignment of a user from the virtual machine to another virtual machine of the delivery group based on a comparison of a load on the virtual machine and the determined threshold, so as to avoid failure of the application to launch.

20 Claims, 8 Drawing Sheets

(56) References Cited

U.S. PATENT DOCUMENTS

2020/0241905 A1* 7/2020 Soman ............... G06F 11/0793
2021/0397469 A1* 12/2021 Babu .................. G06F 11/3419
2022/0198357 A1* 6/2022 Krishnaswamy ...........................
G06Q 10/06315

OTHER PUBLICATIONS

Iyer R K et al: "Measurement and modeling of computer reliability as affected by system activity", ACM Transactions on Computer Systems (TOCS), Association for Computing Machinery, Inc, US, vol. 4, No. 3, Aug. 1, 1986 (Aug. 1, 1986), pp. 214-237, XpP058250223, ISSN: 0734-2071, DOI: 10.1145/6420.6422, p. 223-p. 228.
International Preliminary Report on Patentability for PCT Appl. No. PCT/US2022/011030, dated Jul. 27, 2023, 7 pgs.

* cited by examiner

SYSTEMS AND METHODS TO IMPROVE APPLICATION PERFORMANCE

FIELD OF THE DISCLOSURE

The present application generally relates to virtual networks and desktop environments and systems and methods to improve application performance.

BACKGROUND

In network environments, a client can access a plurality of resources or applications provided through a plurality of servers monitored and tracked by an administrator. The administrator uses manual techniques or requests a third party to troubleshoot issues, track resource availability, or determine infrastructure health within the network.

SUMMARY

Systems and method for determining action insights to address, correct or fix application failures are provided. Sessions to applications and/or devices (e.g., virtual applications, virtual machines, virtual desktops) can be monitored to detect failures and/or predict failures based in part on a failure threshold generated using historical data for the respective application and/or device. The failure threshold can include a dynamic or real-time metric that can be modified in response to failure data and load data associated with the respective application, device and/or server. A device can monitor one or more sessions, for example, to a hosted application or virtual machine and actively monitor the load of the sessions to detect or prevent failures. The device can migrate or transfer one or more sessions from one virtual machine to a different virtual machine in response to a load value of the virtual machine reaching or exceeding an assigned failure threshold and the different virtual machine having a load value less than an assigned failure threshold to prevent or correct a failure. The device can use the failure threshold and failure metrics to provide real-time monitoring of a plurality of sessions and monitor and prevent failures from occurring. The failure threshold can be used to determine when to migrate or transfer a session from a first virtual machine to a second virtual machine in response to a load value of the first application approaching or exceeding the failure threshold.

In at least one aspect, a method is provided. The method can include identifying, by a computing device, an assignment of a user to a virtual machine. The assignment can enable launch of an application with use of the same virtual machine on behalf of the user. The virtual machine can be one of a delivery group of virtual machines. The method can include determining, by the computing device, a threshold for the virtual machine. The threshold can be indicative of likely failure of the virtual machine to launch the application based data about performance of the delivery group. The method can include modifying, by the computing device, the assignment of a user from the virtual machine to another virtual machine of the delivery group based on a comparison of a load on the virtual machine and the determined threshold, so as to avoid failure of the application to launch.

In embodiments, the method can include assigning, by the computing device, at least one threshold to each virtual machine of the delivery group of virtual machines. The at least one threshold can be based on load levels causing failures during one or more sessions to the respective virtual machine. The method can include generating, by the computing device responsive to the load of the virtual machine exceeding the threshold, a notification indicating a potential failure for at least one session to the virtual machine. The threshold can indicate a load limit for the virtual machine. The method can include comparing, by the computing device, load values for a first failure associated with the virtual machine and load values for a second failure associated with the virtual machine. The method can include modifying, by the computing device responsive to the comparison, the threshold for the virtual machine.

The method can include determining, by the computing device responsive to a failure for a session to the another virtual machine, each virtual machine of the delivery group of virtual machines having a load greater than the threshold. The method can include generating, by the computing device, a new virtual machine responsive to each virtual machine of the delivery group of virtual machines having the load greater than the threshold, the new virtual machine added to the delivery group of virtual machines. The method can include transferring, by the computing device, the assignment of the user from the another virtual machine to the new virtual machine. The method can include monitoring, by the computing device using a failure model, an active load on each virtual machine of the delivery group of virtual machines. The failure model can dynamically modify the threshold responsive to subsequent failures associated with a respective virtual machine and the active load associated with the subsequent failures.

In embodiments, the method can include determining, by the computing device for a plurality of sessions between a plurality of client devices and a plurality of virtual machines of the delivery group of virtual machines, a current load for each of the plurality of virtual machines. The method can include generating, by the computing device using the threshold, one or more actions to modify the assignment of one or more sessions to one or more different virtual machines of the plurality of virtual machines responsive to the current load for the respective virtual machines. The method can include generating, by the computing device responsive to the one or more actions, one or more virtual machines to add to the delivery group of virtual machines. The method can include transferring, by the computing device, the assignment of the one or more sessions to the one or more virtual machines generated for the delivery group of virtual machines.

The method can include determining, by the computing device for a subset of the delivery group of virtual machines, an average of load values for virtual machines in the subset. The load values can be associated with one or more failures at the virtual machines. The method can include determining, by the computing device, one or more virtual machines in the subset having a load greater than the average of the load values for the subset. The method can include transferring, by the computing device, the assignment of one or more sessions from the one or more virtual machines to other virtual machines in the subset having a load less than the average of the load values for the subset.

In at least one aspect, a system is provided. The system can include a computing device having one or more processors coupled to memory. The computing device can be configured to identify an assignment of a user to a virtual machine. The assignment can enable launch of an application with use of the same virtual machine on behalf of the user. The virtual machine can be one of a delivery group of virtual machines. The computing device can be configured to determine a threshold for the virtual machine. The threshold can be indicative of likely failure of the virtual machine to launch the application based data about performance of the delivery group. The computing device can be configured to modify the assignment of a user from the virtual machine to another virtual machine of the delivery group based on a comparison of a load on the virtual machine and the determined threshold, so as to avoid failure of the application to launch.

In embodiments, the computing device can be configured to compare load values for a first failure associated with the virtual machine and load values for a second failure associated with the virtual machine. The computing device can be configured to modify, responsive to the comparison, the threshold for the virtual machine. The computing device can be configured to determine, responsive to a failure for a session to the another virtual machine, each virtual machine of the delivery group of virtual machines having a load greater than the threshold. The computing device can be configured to generate a new virtual machine responsive to each virtual machine of the delivery group of virtual machines having the load greater than the threshold, the new virtual machine added to the delivery group of virtual machines. The computing device can be configured to transfer the assignment of the user from the another virtual machine to the new virtual machine.

The computing device can be configured to monitor, using a failure model, an active load on each virtual machine of the delivery group of virtual machines. The failure model can dynamically modify the threshold responsive to subsequent failures associated with a respective virtual machine and the active load associated with the subsequent failures. The computing device can be configured to determine, for a plurality of sessions between a plurality of client devices and a plurality of virtual machines of the delivery group of virtual machines, a current load for each of the plurality of virtual machines. The computing device can be configured to generate, using the threshold, one or more actions to modify the assignment of one or more sessions to one or more different virtual machines of the plurality of virtual machines responsive to the current load for the respective virtual machines.

In embodiments, the computing device can be configured to generate, responsive to the one or more actions, one or more virtual machines to add to the delivery group of virtual machines. The computing device can be configured to transfer the assignment of the one or more sessions to the one or more virtual machines generated for the delivery group of virtual machines. The computing device can be configured to determine, for a subset of the delivery group of virtual machines, an average of load values for virtual machines in the subset. The load values can be associated with one or more failures at the virtual machines. The computing device can be configured to determine one or more virtual machines in the subset having a load greater than the average of the load values for the subset. The computing device can be configured to transfer the assignment of one or more sessions from the one or more virtual machines to other virtual machines in the subset having a load less than the average of the load values for the subset.

In at least one aspect, a non-transitory computer-readable medium is provided. The non-transitory computer-readable medium can include instructions that, when executed by the processor of a device, cause the processor to identify an assignment of a user to a virtual machine. The assignment can enable launch of an application with use of the same virtual machine on behalf of the user. The virtual machine can be one of a delivery group of virtual machines. The non-transitory computer-readable medium can include instructions that, when executed by the processor of a device, cause the processor to determine a threshold for the virtual machine. The threshold can be indicative of likely failure of the virtual machine to launch the application based data about performance of the delivery group. The non-transitory computer-readable medium can include instructions that, when executed by the processor of a device, cause the processor to modify the assignment of a user from the virtual machine to another virtual machine of the delivery group based on a comparison of a load on the virtual machine and the determined threshold, so as to avoid failure of the application to launch.

In embodiments, the non-transitory computer-readable medium can include instructions that, when executed by the processor of a device, cause the processor to determine, responsive to a failure for a session to the another virtual machine, each virtual machine of the delivery group of virtual machines having a load greater than the threshold. The non-transitory computer-readable medium can include instructions that, when executed by the processor of a device, cause the processor to generate a new virtual machine responsive to each virtual machine of the delivery group of virtual machines having the load greater than the threshold. The new virtual machine can be added to the delivery group of virtual machines. The non-transitory computer-readable medium can include instructions that, when executed by the processor of a device, cause the processor to transfer the assignment of the user from the another virtual machine to the new virtual machine.

The non-transitory computer-readable medium can include instructions that, when executed by the processor of a device, cause the processor to determine, for a subset of the delivery group of virtual machines, an average of load values for virtual machines in the subset. The load values can be associated with one or more failures at the virtual machines. The non-transitory computer-readable medium can include instructions that, when executed by the processor of a device, cause the processor to determine one or more virtual machines in the subset having a load greater than the average of the load values for the subset. The non-transitory computer-readable medium can include instructions that, when executed by the processor of a device, cause the processor to transfer the assignment of one or more sessions from the one or more virtual machines to other virtual machines in the subset having a load less than the average of the load values for the subset.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Figure 1A:
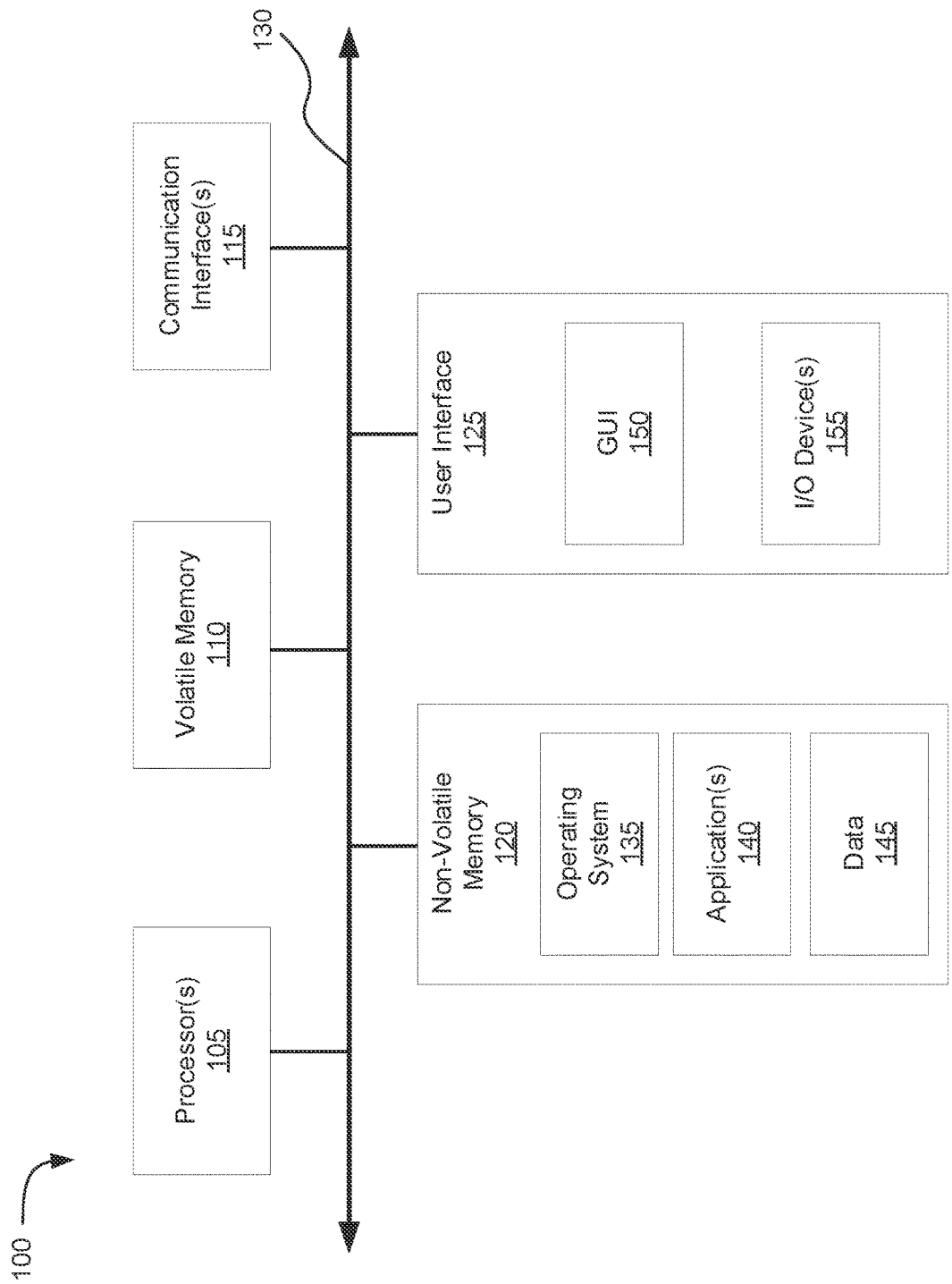
FIG. 1A is a block diagram of embodiments of a computing device.

System and method for heuristic solutions that provides actionable insights to address or fix application failures, for example, using machine learning techniques are provided here. Sessions to applications, devices, and/or servers can be monitored to detect failures and/or predict failures based in part on a failure threshold generated using historical data for the respective application, device and/or server. The failure threshold can include a dynamic or real-time metric that can be modified in response to failure data and load data associated with the respective application, device and/or server. A device can monitor one or more sessions, for example, to a virtual machine and actively monitor the load of the sessions to detect or prevent failures. The device can migrate or transfer one or more sessions from a first virtual machine to a second virtual machine in response to a load value of the first virtual machine reaching or exceeding an assigned failure threshold and the second virtual machine having a load value less than an assigned failure threshold to prevent or correct a failure.

In general, administrators of virtualized desktop and application environments monitor and track resource availability in a network and troubleshoot issues if problems arise. In response, administrators use manual techniques or request a third party to troubleshoot issues, track resource availability, or determine infrastructure health within the network. The manual efforts and troubleshooting require substantial expertise and know-how concerning products, software and hardware architectures, and networking which is not generally available or must be purchased from others, like the vendor of the software product at issue. Such efforts are also time consuming to perform which increases costs and causes delays. In some situations, the administrators may not be made aware of the issue or failure until a user (e.g., employee) notifies the site administrator of the issue the respective user is experiencing during a session to an application or attempting to launch a session to an application. The administrator may have to access monitoring tools and different services to identify the cause of the issues and determine which of the users that may be experiencing the same or similar issues. The issues can include not being able to launch the application hosted by a virtual machine and latency associated with the application hosted by a virtual machine. In a virtualized environment, many factors can impact or influence the delivery of applications and/or desktops to users, including network, geographic location and infrastructure. In some embodiments, performance degradation can be caused from a high load on a virtual machine and an application provided by the virtual machine further slowing it down and/or causing the device to reject incoming session launch requests from a broker and/or end point (e.g., client device). Thus, the administrator may have to access multiple monitoring tools and different services to identify the causes of an issue and then determine metrics associated with a plurality of user sessions to determine which users and/or sessions are experiencing the issue. The cause analysis can include a complex and time consuming manual effort by an administrator, further reducing user experience and delay in correcting or addressing the issue and/or failure.

The systems and methods provided herein can determine and generate dynamic and real-time metrics to monitor and detect sessions having a reduced performance and/or prevent failures from occurring. A device can intelligently monitor and automatically detect user sessions experiencing a reduced or bad performance and provide actions or recommendations to correct the issue or improve the performance for the user session. The device can generate a threshold (e.g., a failure threshold) using historical data of one or more previous sessions, applications (e.g., virtual application) and/or computing devices (e.g., virtual machines) hosting applications. The historical data can include previous failures and load values associated with the failures. The failures can include any issue in establishing or maintaining a session to an application or virtual machine, for example, a failure can include, but is not limited to, a failure to launch a session to an application, a failure during a session to a virtual machine, a connection timeout, and/or a configuration error causing a session request to be refused. The device can actively monitor one or more sessions to one or more virtual machines to detect when a failure occurs or when a failure may occur and prevent the failure from occurring. The threshold can be used to determine when to migrate or transfer a session from a first virtual machine to a second virtual machine in response to a load value of the first virtual machine approaching or exceeding that threshold.

The metrics for detecting and prevent failures can be generated using data (e.g., data for a current session, historical data from one or more previous sessions) and/or insights into previous issues experienced during user sessions. The insights can include previous actions or recommendations applied to previous failures to fix or correct the respective failure. The insights can be generated, for example, by comparing metrics associated with a current failure (e.g., load values, virtual machine) to determine if a previous action or recommendation may apply to the current failure (e.g., similar load values, same virtual machine). In embodiments, the insights can include an action to be performed to address a failure and/or indicate a new virtual machine to migrate a session from an overloaded virtual machine. For example, the device can identify issues or failures associated with static assignments of end points (e.g., users, client devices) to applications (e.g., virtual delivery agent) hosted by virtual machine and determine a different virtual machine to migrate the session to based in part on load values. The end points or users experiencing failures can be identified for a determine time period or duration. In some embodiments, the device can receive or request the data about a failure from a monitoring service and/or analytics service connected to the device and monitoring one or more sessions in the network. The device can filter or sort the failure data, for example, by cause of the failure, time value associated with the failure and/or virtual machine associated with the failure. In embodiments, for individual sessions that experience a failure, the device can determine the virtual machine the end point is assigned to and/or the application the end point is accessing.

The device can determine a group (e.g., a delivery group) of the applications and/or virtual machines associated with the failures, for example, a group of virtual machines having one or more virtual machines experiencing at least one failure. The thresholds for individual virtual machines in the same or common group can be determined based in part on previous failures experienced at the respective virtual machines and load values associated with the failures. The threshold can be determined using techniques like n-percentile, minima and/or machine learning techniques. The threshold can be unique to a virtual machine or to a group of virtual machines. The device can use the threshold to determine which virtual machines in the same group have load values below their respective failure threshold and which virtual machines have load greater than or within a range (e.g., a determined range) of the their respective threshold. The device can generate an action or recommendation to move a session experience a failure to a different virtual machine in the same delivery group having a load value less than the threshold. In some embodiments, the device can automatically or dynamically migrate a session from an virtual machine having a load near or at the failure threshold to a different virtual machine having a load value less than the threshold to prevent a failure or issue during that session. The migration of sessions to different virtual machines can be tracked and stored to monitor if the action improved the performance of the session and/or update historical data for a virtual machine.

In embodiments, a threshold can be assigned or tagged to individual virtual machines based on the historical data indicating at what load the respective virtual machine becomes prone to cause a failure or degraded performance. The device can monitor and analyze the virtual machines to determine when the virtual machines may exceed the threshold, for example, in the background of the sessions to the virtual machine. The failure detection can be automated using the threshold such that issues, errors and/or potential failures are actively detected using real-time load values of the virtual machines to determine when a virtual machine is within a determined range of the threshold or reaches the threshold.

The device can store and maintain the thresholds for virtual machines to reuse or re-assign to a virtual machine. The performance of the threshold can be monitored to detect if the threshold is preventing failures or if failures are still occurring and the threshold should be modified. For example, the device can store the thresholds and measure or compare the performance of one or more virtual machines and user sessions to the virtual machines prior to migration and after migration to determine if the migration improved the performance of the virtual machines or should be modified to correct or address continuing failures after the migration. The device can provide a single interface and/or component to monitor, address and handle failure related issues across different groups having a plurality of virtual machines.

In embodiments, the data about a failure, threshold, load values and other metrics can be graphed and/or displayed through an interface of the device and/or a client device to illustrate a number of failures or degraded performance of a virtual machine. The graphs can show or compare a performance of one or more virtual machines before an action (e.g., migration of sessions) is performed and a performance of the one or more virtual machines after the action is performed, for example, to determine an impact or benefit of the action. The device can display a number of failures experienced over a determined time period, for a group of virtual machines and/or for a particular group of users. The device can display the or group the virtual machines having load greater than a threshold and virtual machines having load less than a threshold to notify or alert the device and/or an administrator where to migrate sessions between virtual machines.

In some embodiments, the device can graph the load values for the virtual machines in real-time and include a threshold to provide or enable active monitoring of sessions of applications and virtual machines. The graph can indicate when a virtual machine is approaching a threshold indicative of failure, within a critical range of a threshold and/or exceeds a threshold for the device to implement or perform an action to address the issues causing or leading to a failure or otherwise poor performance of the virtual machine. In embodiments, the graph can indicate or highlight virtual machines having load values less than a threshold and recommend virtual machines to migrate a session from a highly loaded virtual machine or an virtual machine having a load value near or greater than the threshold.

The device can determine historic and predicted trends for failures for one or more virtual machines or one or more groups of virtual machines. The trends can indicate how a load value for a virtual machine is trending or predicted load values for a virtual machine over a determined time period and/or at particular time intervals during a time period. In embodiments, the trend data can show or indicate what may happen if an action or fix is applied and what may happen if an action or fix is not applied. For example, the trend data can indicate load values for a virtual machine over a future time period if one or more sessions are migrated versus if the one or more sessions are not migrated and maintained at the virtual machine. The device can determine top uses or end points experiencing the most failures and generate recommendations and/or actions to correct or fix the issues causing the failures for those users and/or end points.

In embodiments, the device can access or execute a provisioning service to provision or add virtual machines, for example, when no virtual machines are available to receive a session or have load values greater than a threshold. The device can determine that a session to a virtual machine in a group should be migrated to an virtual machine having a load value less than a threshold and that no virtual machine in the group have load values less than the threshold. The device can request or contact the provision service to provision one or more virtual machines to migrate the session and/or distribute load in the group. In some embodiments, the device can add or request that one or more virtual machines are added to a group to migrate the session and/or distribute load in the group.

The threshold and failure metrics can be generated using a machine learning techniques, including a failure model. The device can execute the failure model to determine a threshold for a virtual machine and/or group of virtual machines. The device can model the failure counts or data about failures using one or more of the following inputs, an end point identifier (e.g., user ID, device ID), group identifier, computing device ID (e.g., virtual machine ID), a session count, a failure count, a failure target count, and/or a time range. The device can model the load on an application and/or group using one or more of the following inputs, an end point identifier (e.g., user ID, device ID), group identifier, computing device ID (e.g., virtual machine ID), a session count, average load index, a load value target, and/or a time range.

In some embodiments, the device can use the data about failures and load data to determine when to scale down a number virtual machines in a group of virtual machines and/or power off one or more virtual machines in a group based in part on the load values of the respective virtual machines and/or the load values across the group. The device can use the failure metrics as described herein to provide real-time and active management of sessions to perform actions to correct or address failures as they occur or before they occur and improve an end user experience.

Section A describes a computing environment which may be useful for practicing embodiments described herein;

Section B describes methods and systems for detecting and monitoring failures to virtual machines.

A. Computing Environment

Prior to discussing the specifics of embodiments of the systems and methods of for securing offline data (e.g., browser offline data) for shared accounts, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
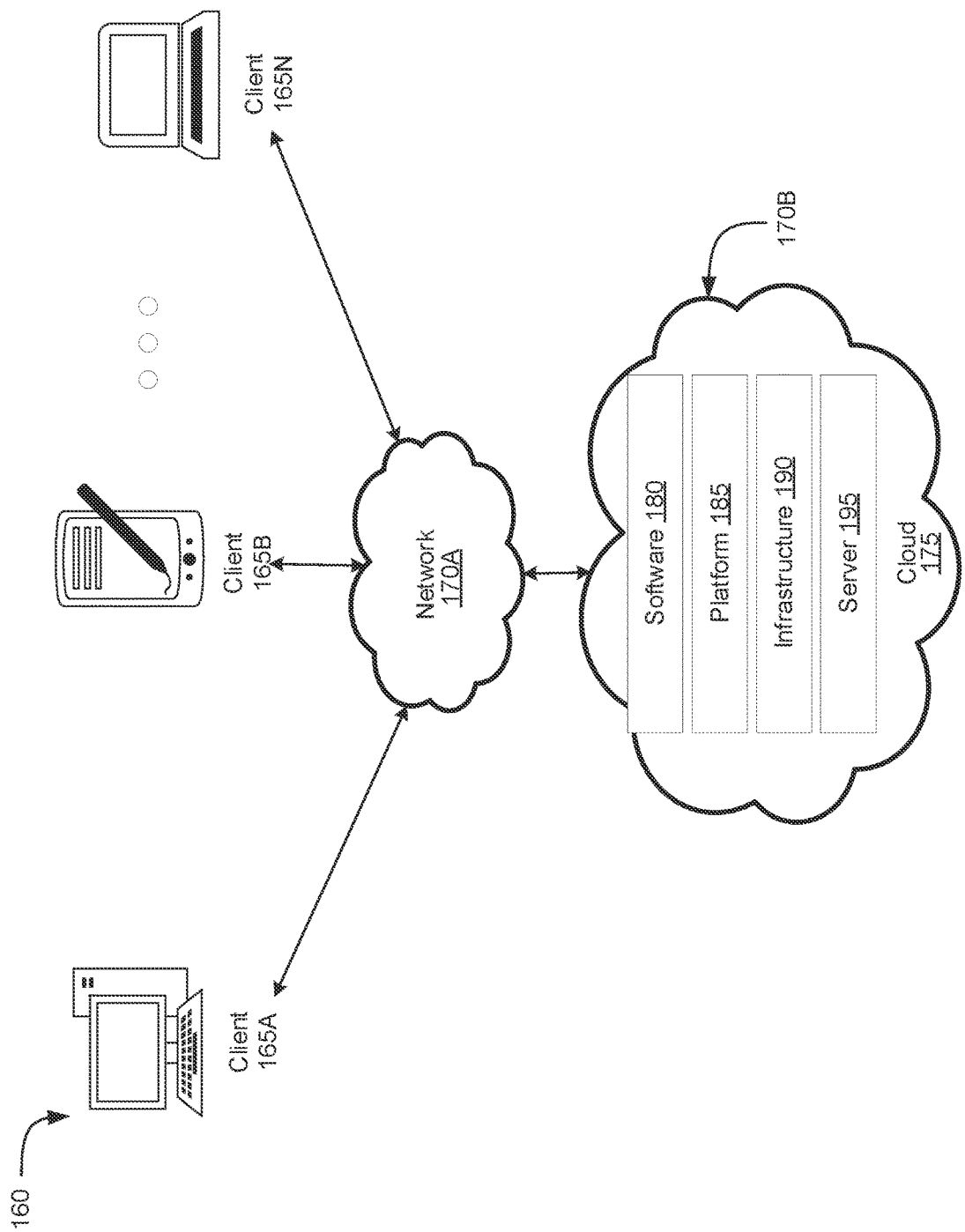
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but are not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, Java Mail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2A:
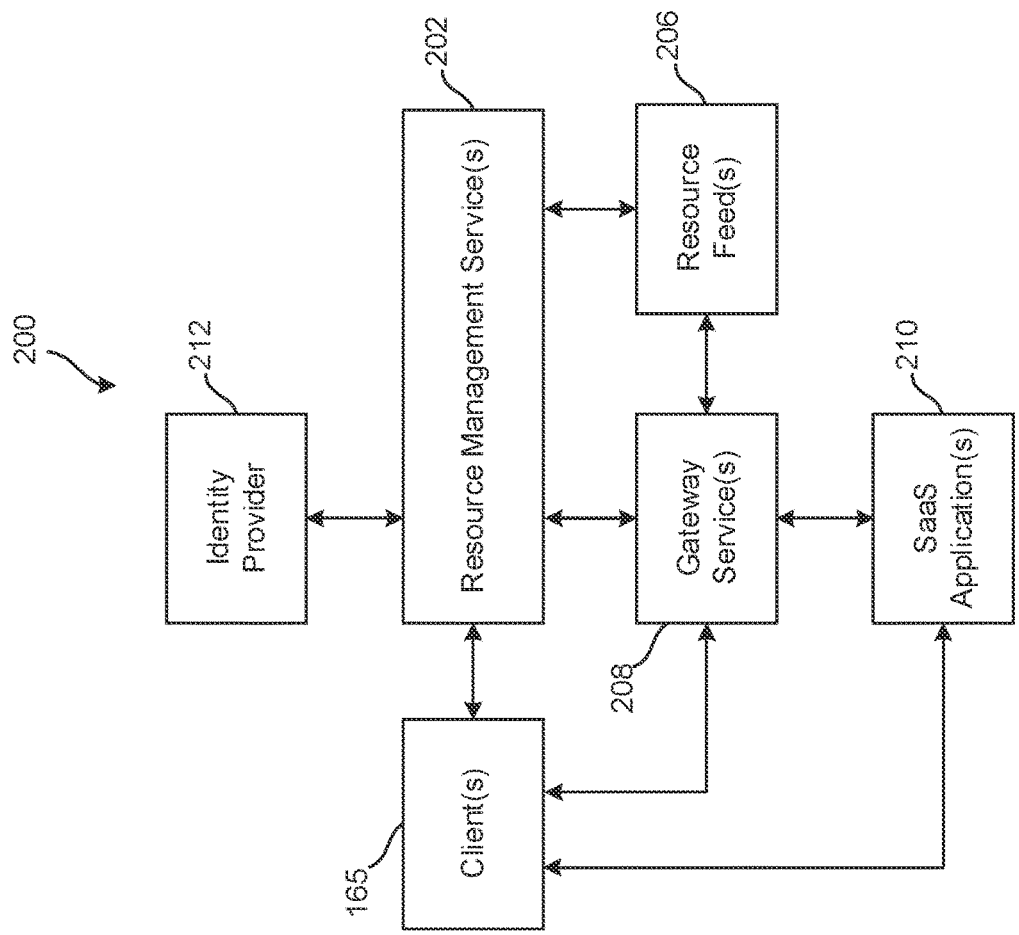
FIG. 2A is a block diagram of an example system in which resource management services may manage and streamline access by clients to resource feeds (via one or more gateway services) and/or software-as-a-service (SaaS) applications.

FIG. 2A is a block diagram of an example system 200 in which one or more resource management services 202 may manage and streamline access by one or more clients 165 to one or more resource feeds 206 (via one or more gateway services 208) and/or one or more software-as-a-service (SaaS) applications 210. In particular, the resource management service(s) 202 may employ an identity provider 212 to authenticate the identity of a user of a client 165 and, following authentication, identify one of more resources the user is authorized to access. In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 165 may be any type of computing devices capable of accessing the resource feed(s) 206 and/or the SaaS application(s) 210, and may, for example, include a variety of desktop or laptop computers, smartphones, tablets, etc. The resource feed(s) 206 may include any of numerous resource types and may be provided from any of numerous locations. In some embodiments, for example, the resource feed(s) 206 may include one or more systems or services for providing virtual applications and/or desktops to the client(s) 165, one or more file repositories and/or file sharing systems, one or more secure browser services, one or more access control services for the SaaS applications 210, one or more management services for local applications on the client(s) 165, one or more internet enabled devices or sensors, etc. Each of the resource management service(s) 202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
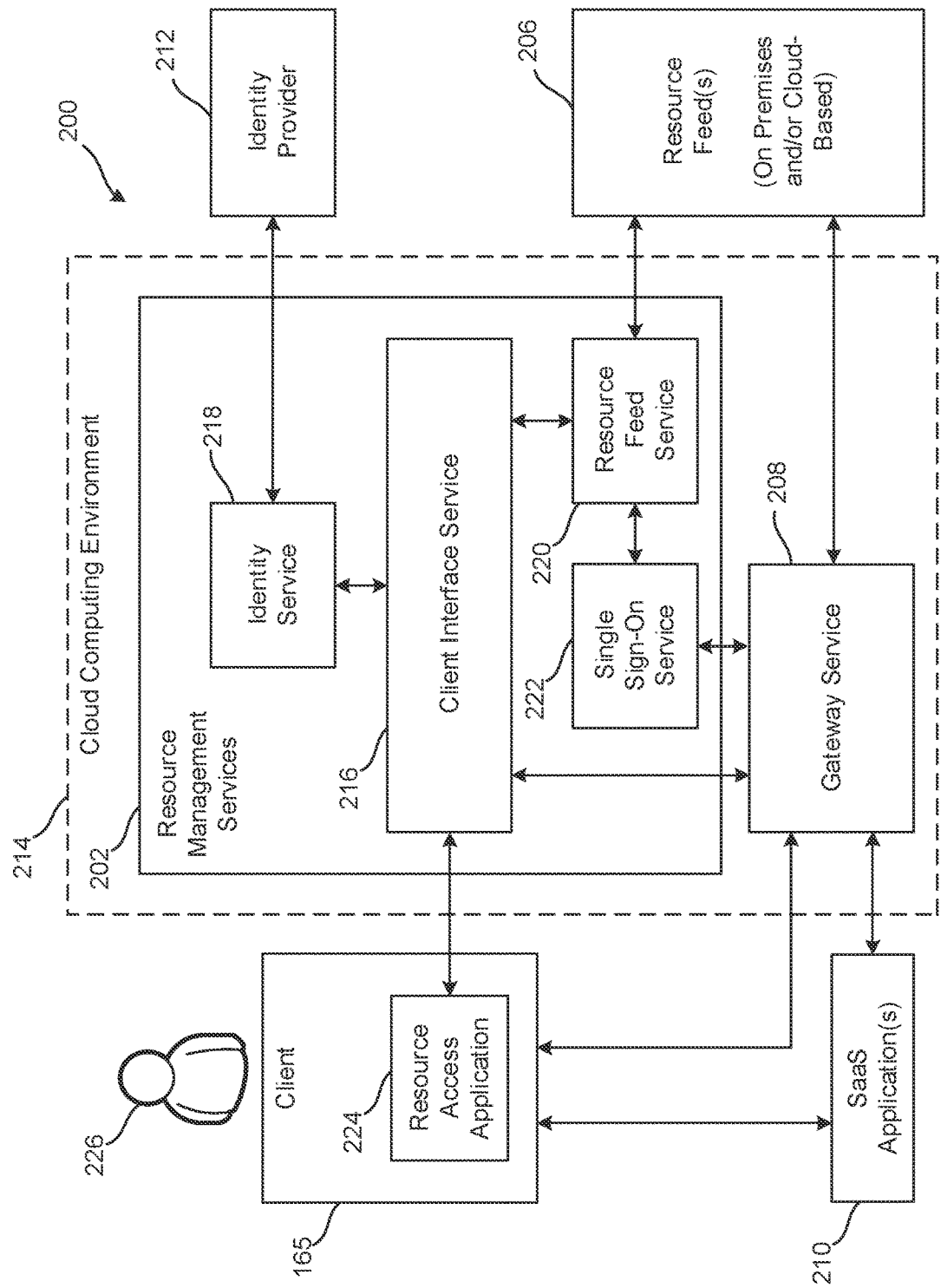
FIG. 2B is a block diagram showing an example implementation of the system shown in FIG. 2A in which various resource management services as well as a gateway service are located within a cloud computing environment.

FIG. 2B is a block diagram showing an example implementation of the system 200 shown in FIG. 2A in which various resource management services 202 as well as a gateway service 208 are located within a cloud computing environment 214. The cloud computing environment may, for example, include Microsoft Azure Cloud, Amazon Web Services, Google Cloud, or IBM Cloud.

For any of illustrated components (other than the client 165) that are not based within the cloud computing environment 214, cloud connectors (not shown in FIG. 2B) may be used to interface those components with the cloud computing environment 214. Such cloud connectors may, for example, run on Windows Server instances hosted in resource locations and may create a reverse proxy to route traffic between the site(s) and the cloud computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 224 is launched or otherwise accessed by the user 226, the client interface service 216 may send a sign-on request to the identity service 218. In some embodiments, the identity provider 212 may be located on the premises of the organization for which the system 200 is deployed. The identity provider 212 may, for example, correspond to an on-premises Windows Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a Microsoft Azure Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For each configured resource feed, the resource feed service 220 may request an identity token from the single sign-on service 222. The resource feed service 220 may then pass the feed-specific identity tokens it receives to the points of authentication for the respective resource feeds 206. Each resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 165, and/or one or more SaaS applications 210 to which the user 226 has subscribed. The lists of local applications and the SaaS applications 210 may, for example, be supplied by resource feeds 206 for respective services that manage which such applications are to be made available to the user 226 via the resource access application 224. Examples of SaaS applications 210 that may be managed and accessed as described herein include Microsoft Office 365 applications, SAP SaaS applications, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to seamlessly authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 request a one-time uniform resource locator (URL) from the gateway service 208 as well a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for identified SaaS application 210 and present the assertion. The SaaS may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource application 224 is located remotely), e.g., via a secure browser service. In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 165 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 165 to notify a user 226 of something that requires the user's attention (e.g., approval of an expense report, new course available for registration, etc.).

Figure 2C:
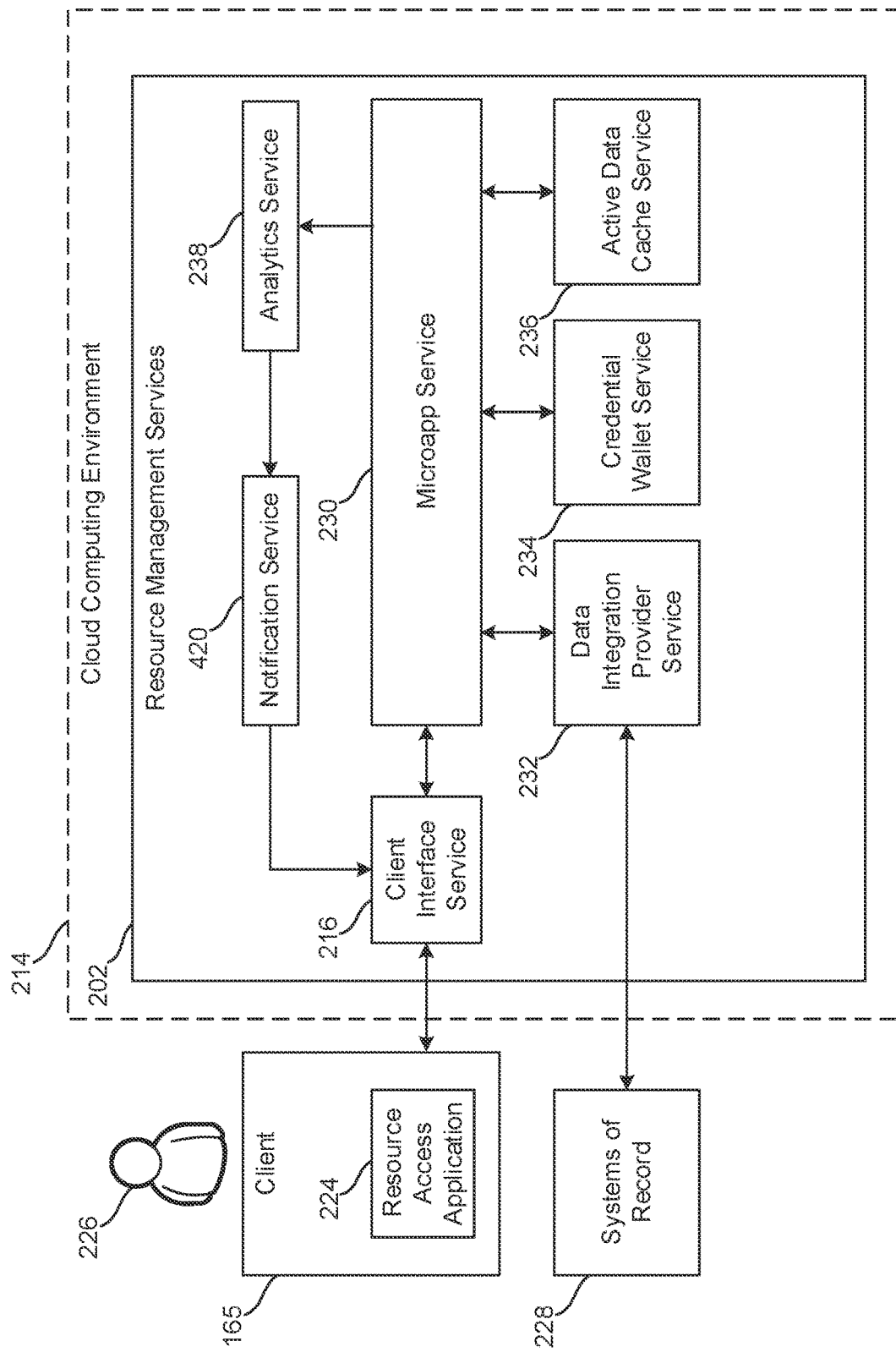
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some implementations, microapps may be configured within the cloud computing environment 214, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to the systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapps service 230 to create targeted scored notifications and send such notifications to the notification service 240.

Finally, in some embodiments, the notification service 240 may process any notifications it receives from the analytics service 238. In some implementations, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232. The data integration provider service 232 may then decrypt the service account credentials and use those credentials to retrieve data from the systems of record 228. The data integration provider service 232 may then stream the retrieved data to the microapp service 230. The microapp service 230 may store the received systems of record data in the active data cache service 236 and also send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted Oauth2 token for the system of record for which the action is to be invoked, and may send the action to the data integration provider service 232 together with the encrypted Oath2 token. The data integration provider service 232 may then decrypt the Oath2 token and write the action to the appropriate system of record under the identity of the user 226. The data integration provider service 232 may then read back changed data from the written-to system of record and send that changed data to the microapp service 230. The microapp service 232 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back-end. In some embodiments, users may be able to interact with the virtual assistance through either the resource access application 224 or directly from another resource, such as Microsoft Teams. This feature may allow employees to work efficiently, stay organized, and deliver only the specific information they're looking for.

B. Methods and Systems for Determining Action Insights to Address Application Failures System and method for determining action insights to address application failures are provided herein. A device can actively monitor sessions of applications hosted by computing devices (e.g., virtual machines, virtual desktops) to detect failures or degraded performance and/or predict failures or otherwise poor performance based in part on a threshold generated using data (e.g., historical data) for the respective virtual machine. The threshold can be assigned to individual virtual machines or to a group of virtual machines. The threshold can include a dynamic or real-time metric or value generated based in part on data about failures and load data associated with the respective virtual machine hosting an application. The device can monitor one or more sessions, for example, to a hosted application or virtual machine and actively monitor the load of the sessions to detect or prevent failures or poor performance (e.g., latency of an application) using the threshold. The device can determine action insights to correct or prevent failures. The action insights can include or indicate reasons for a failure, users experiencing failures, virtual machines experiences failures, metrics (e.g., load values) associated with the failures, and/or recommendations to fix the failures. In embodiments, the recommendations can include previous actions or recommendations applied to previous failures to fix or correct the respective failure. In some embodiments, the action insights can include a graph showing load trends, for example, if an action or recommendations is not performed. The device can use the action insights to identify at least one action to perform to correct a failure or prevent a failure. In some embodiments, the action can include migrating or transferring one or more sessions from a first virtual machine to a second virtual machine in response to a load value of the first virtual machine reaching or exceeding an assigned threshold and the second virtual machine having a load value less than an assigned threshold to prevent or correct a failure or otherwise remedy degraded performance of the application.

Figure 3:
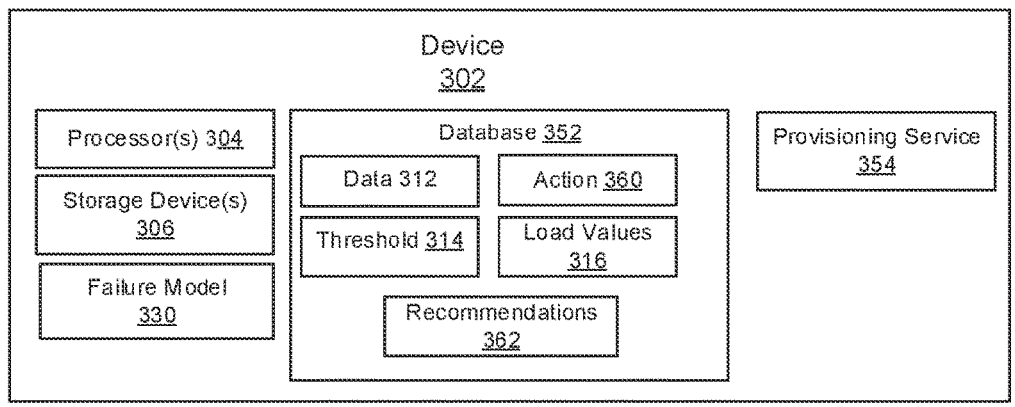
FIG. 3 is a block diagram of a system for detecting and monitoring failures to virtual machines, in accordance with an illustrative embodiment.
Figure 3:
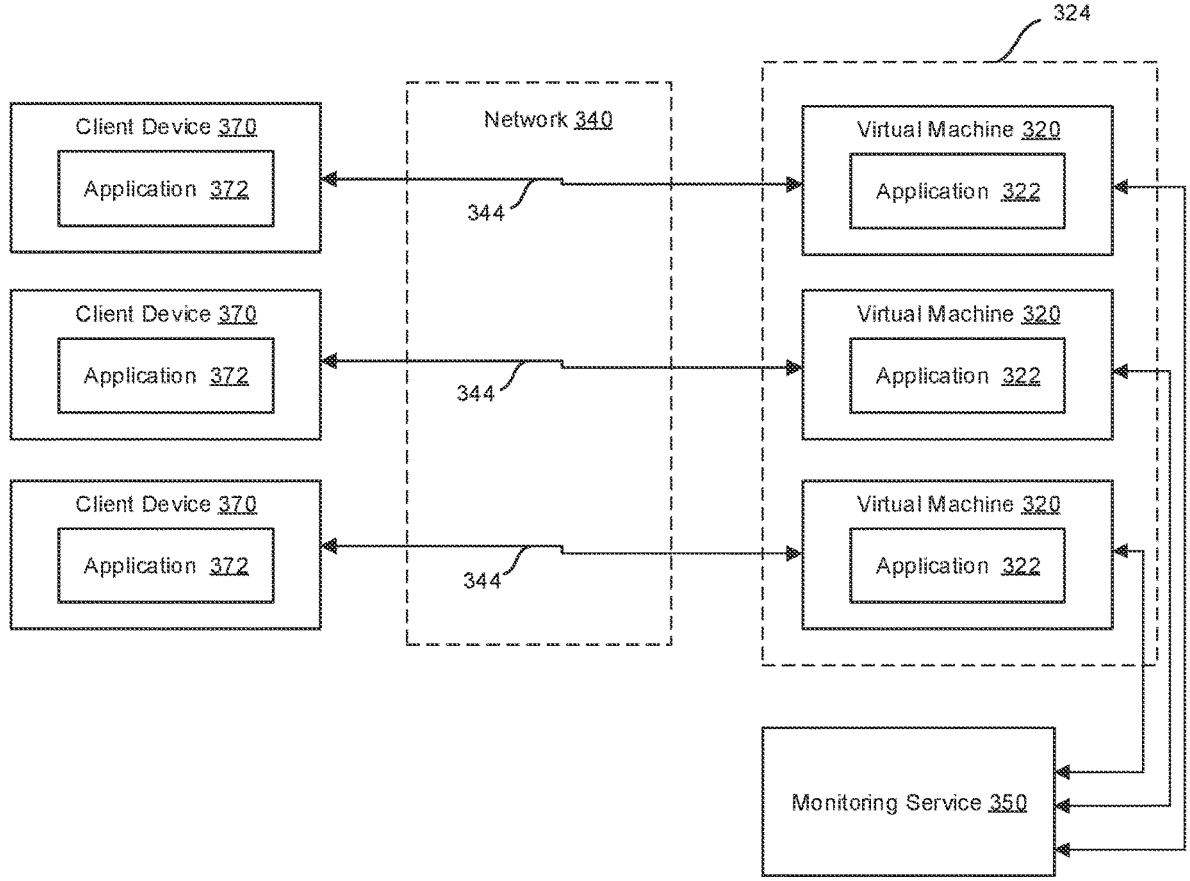

Referring now to FIG. 3, depicted is a block diagram of a system 300 for detecting and/or preventing failures to hosted application 322 hosted or provided by virtual machines 320. The system 300 can include a group 324 of virtual machines 320 and sessions 344 of virtual machines 320 that enable client devices 370 to communicate with the virtual machines (or servers) to access a virtual desktop or other web application (e.g., a Software-As-A-Service or SaaS application), referred to generally as a hosted application 322 herein. The system 300 can include a device 302 (e.g., host server), a plurality of client devices 370, one or more groups 324 having a plurality of virtual machines 320 and one or more hosted applications 322.

A device 302 (also referred to herein as computing device) can include a server, host server, or computing device. The device 302 can monitor one or more sessions to virtual machines 320 and hosted applications 322 to detect and/or prevent failures or degraded performance using a threshold (e.g., failure threshold). The device 302 can be implemented using hardware or a combination of software and hardware. For example, components of the device 302 can include logical circuitry (e.g., a central processing unit or CPU) that responds to and processes instructions fetched from a memory unit (e.g., storage device 306). Components of the device 302 can include or use a microprocessor or a multi-core processor. A multi-core processor can include two or more processing units (e.g., processor 304) on a single computing component. Components of the device 302 can be based on any of these processors, or any other processor capable of operating as described herein. Processors can utilize instruction level parallelism, thread level parallelism, different levels of cache, etc. For example, the device 302 can include at least one logic device such as a computing device or server having at least one processor 304 to communicate. The components and elements of the device 302 can be separate components or a single component. The device 302 can include a memory component (e.g., storage device 306) to store and retrieve data (e.g., data 312, threshold 314, load values 316). The memory can include a random access memory (RAM) or other dynamic storage device, coupled with the storage device 306 for storing information, and instructions to be executed by the client device 370. The memory can include at least one read only memory (ROM) or other static storage device coupled with the storage device 306 for storing static information and instructions for the device 302. The memory can include a storage device 306, such as a solid state device, magnetic disk or optical disk, to persistently store information and instructions. Although shown as a single device 302, device 302 can include a plurality of servers, such as a server farm, cloud of virtual machines executed by one or more physical machines, or other type and form of computing devices. The device 302 can be the same as or substantially similar to computing device 100 of FIG. 1A, server 195 of FIG. 1B, and/or one or more components of cloud computing environment 214 of FIGS. 2A-2C.

The device 302 can include a processor 304. The processor 304 can include non-volatile memory that stores computer instructions and an operating system. For example, the computer instructions can be executed by the processor 304 out of volatile memory to perform all or part of the methods 400 and 500. In some embodiments, the device 302 can include a non-transitory computer-readable medium, comprising instructions that, when executed by the processor 304 of the device 302, cause the processor 304 to perform all or part of the methods 400 and 500. The processor 304 can be the same as or substantially similar to processor 105 of FIG. 1A.

The virtual machine 320 can include a computing device, server, or hosted computing device providing one or more hosted applications 322. In embodiments, the virtual machine 320 can be hosted a server(s) that provides client devices 370 with access to applications 322 over one or more networks 340. Individual sessions 344 or communications between virtual machines 320 and client devices 370 can be monitored by the device and/or a monitoring server 350, and connections or operational characteristics may be provided to the device 302 and monitoring server 350 for collecting data 312 and failure mitigation. In embodiments, the virtual machine 320 can be the same as or substantially similar to computer 100 of FIG. 1A and/or server 195 of FIG. 1B.

The virtual machine 320 can be implemented using hardware or a combination of software and hardware. For example, components of the virtual machine 320 can include logical circuitry (e.g., a central processing unit or CPU) that responds to and processes instructions fetched from a memory unit (e.g., storage device 306). Components of the virtual machine 320 can include or use a microprocessor or a multi-core processor. A multi-core processor can include two or more processing units (e.g., processor 304) on a single computing component. Components of the virtual machine 320 can be based on any of these processors, or any other processor capable of operating as described herein. Processors can utilize instruction level parallelism, thread level parallelism, different levels of cache, etc. For example, the virtual machine 320 can include at least one logic device such as a computing device or server having at least one processor 304 to communicate. The components and elements of the virtual machine 320 can be separate components or a single component. The virtual machine 320 can include a memory component (e.g., storage device 306) to store and retrieve data (e.g., data 312, thresholds 314, load values 316). The memory can include a random access memory (RAM) or other dynamic storage device, coupled with the storage device 306 for storing information, and instructions to be executed by the virtual machine 320. The memory can include at least one read only memory (ROM) or other static storage device coupled with the storage device 306 for storing static information and instructions for the virtual machine 320. The memory can include a storage device 306, such as a solid state device, magnetic disk or optical disk, to persistently store information and instructions.

The virtual machine 320 can include a processor 304. The processor 304 can include non-volatile memory that stores computer instructions and an operating system. For example, the computer instructions can be executed by the processor 304 out of volatile memory to perform all or part of the methods 400 and 500. In some embodiments, the virtual machine 320 can include a non-transitory computer-readable medium, comprising instructions that, when executed by the processor 304 of the virtual machine 320, cause the processor 304 to perform all or part of the methods 400 and 500.

The virtual machine 320 can host, provide or enable access to one or more hosted applications 322. The hosted application 322 can include resources, desktops, and or files. In embodiments, the hosted application 322 can include virtual applications, Software as a Service (SaaS) applications, virtual desktops, web applications, mobile applications, virtual agents and other forms of content. The hosted application 322 can include a cloud computing service, infrastructure as a service (IaaS), platform as a service (PaaS), desktop as a Service (DaaS), managed software as a service (MSaaS), mobile backend as a service (MBaaS), and information technology management as a service (ITMaaS). In some embodiments, the hosted application 322 can include or correspond to applications provided by remote servers or third party servers. In embodiments, the hosted application 322 can include or correspond to application 140 of FIG. 1A and/or the SaaS applications 210 of FIGS. 2A-2B.

In embodiments, the hosted application 322 may provide or host a virtual desktop environment for one or more client devices 370. For example, a client device 370 may launch a session 344 (e.g., via client application 372) to connect or access virtual desktop environment hosted by the virtual machine 320 by connecting to one or more hosted applications 322 that are stored and/or executed on the virtual machine 320. The hosted application 322 can be or include a virtual delivery agent (VDA) or other application that enables client devices 370 to access a virtual desktop that is maintained by one or more of the virtual machines 320. The hosted application 322 can include at least one processor 304 that can include non-volatile memory that stores computer instructions and an operating system. The computer instructions can be executed by the processor out of volatile memory to perform all or part of the methods 400 and 500. In some embodiments, the hosted application 322 can include a non-transitory computer-readable medium, comprising instructions that, when executed by the processor of the hosted application 322, cause the processor to perform all or part of the methods 400 and 500.

A group (e.g., a delivery group) 324 can include a plurality of virtual machines 320 assigned or designated for a group of users and/or client devices 370. The group 324 can indicate or identify the users and/or client devices 370 provided access or authorized to access the virtual machines 320 of the group 324. In embodiments, the users and/or client devices 370 authorized for a group 324 of virtual machines 320 can be authorized to access the hosted applications and/or virtual desktops provided by the virtual machines 320 of the group 324. The device 302 can select or assign virtual machines 320 to a group 324 based in part on need, load values 316 of individual virtual machines 320 and/or an average load across multiple virtual machines 320 forming a group 324. In some embodiments, the device 302 can access or connect to a provisioning service 354 to provision one or more virtual machines 320 for a group 324 or to add one or more virtual machines 320 to a group 324.

The client device 370 can include an end point, a computing device or a mobile device. The client device 370 can include or correspond to an instance of any client device, mobile device or computer device described herein. For example, the client device 370 can be the same as or substantially similar to computer 100 of FIG. 1A, and/or client 165 of FIG. 1B-2C. The client device 370 can be implemented using hardware or a combination of software and hardware. For example, components of the client device 370 can include logical circuitry (e.g., a central processing unit or CPU) that responds to and processes instructions fetched from a memory unit (e.g., storage device 306). Components of the client device 370 can include or use a microprocessor or a multi-core processor. A multi-core processor can include two or more processing units (e.g., processor 304) on a single computing component. Components of the client device 370 can be based on any of these processors, or any other processor capable of operating as described herein. Processors can utilize instruction level parallelism, thread level parallelism, different levels of cache, etc. For example, the client device 370 can include at least one logic device such as a computing device or server having at least one processor 304 to communicate. The components and elements of the client device 370 can be separate components or a single component. The client device 370 can include a memory component (e.g., storage device 306) to store and retrieve data (e.g., data 312, thresholds 314, load values 316). The memory can include a random access memory (RAM) or other dynamic storage device, coupled with the storage device 306 for storing information, and instructions to be executed by the client device 370. The memory can include at least one read only memory (ROM) or other static storage device coupled with the storage device 306 for storing static information and instructions for the client device 370. The memory can include a storage device 306, such as a solid state device, magnetic disk or optical disk, to persistently store information and instructions.

The client device 370 can include a processor 304. The processor 304 can include non-volatile memory that stores computer instructions and an operating system. For example, the computer instructions can be executed by the processor 304 out of volatile memory to perform all or part of the methods 400 and 500. In some embodiments, the client device 370 can include a non-transitory computer-readable medium, comprising instructions that, when executed by the processor 304 of the client device 370, cause the processor 304 to perform all or part of the methods 400 and 500. The processor 304 can be the same as or substantially similar to processor 105 of FIG. 1A.

The client device 370 can include or execute an application 372 (referred to herein as client application 372). The client application 372 can include resources, desktops, and or files. In embodiments, the client application 372 can include local applications (e.g., local to a client device 370), hosted applications, Software as a Service (SaaS) applications, virtual desktops, virtual applications, web applications, mobile applications, and other forms of content. The client application 372 can include a cloud computing service, infrastructure as a service (IaaS), platform as a service (PaaS), desktop as a Service (DaaS), managed software as a service (MSaaS), mobile backend as a service (MBaaS), and information technology management as a service (ITMaaS). In some embodiments, the client application 372 can include or correspond to applications provided by remote servers or third party servers. In embodiments, the client application 372 can include or correspond to application 140 of FIG. 1A and/or SaaS applications 210 of FIGS. 2A-2B.

The client application 372 can establish a session 344 to virtual machine 320 and/or hosted application 322 for the client device 370. The client application 372 can include at least one processor 304 that can include non-volatile memory that stores computer instructions and an operating system. The computer instructions can be executed by the processor out of volatile memory to perform all or part of the methods 400 and 500. In some embodiments, the client application 372 can include a non-transitory computer-readable medium, comprising instructions that, when executed by the processor of the client application 372, cause the processor to perform all or part of the methods 400 and 500.

The device 302 can collect and/or record data 312 associated with one or more sessions 344 of virtual machines 320 and hosted applications 322. The data 312 can include information about attempts to launch a session 344 with use of virtual machines 320 and hosted applications 322. The data 312 can include metrics, values, and/or identifying information for one or more failures or degraded performance (e.g., failure to launch a session 344 or failures during a session 344). The data 312 can include any information recorded or collected by device 302, a client device 370, a client application 372, a virtual machine 320, a hosted application 322 and/or monitoring service 350 corresponding to or associated with a session 344 (e.g., a failure to launch a session 344). The data 312 can include load values 316 associated with one or more sessions 344 to virtual machines 320 and hosted applications 322 and/or load values for a group 324 of virtual machines 320. The device 302 can collect or receive the data 312 from a variety of different sources, including but not limited to, client devices 370, machines 320, and/or applications 322. The data 312 can include client data or customer data associated with one or more previous sessions between client devices 370, hosted applications 322 and/or virtual machines 320. The data 312 can include historical data such as previous failures to one or more hosted applications 322, failures to launch a session to one or more hosted applications 322, time values (e.g., time stamp) associated with the failures, and load values 316 of the hosted applications 322 when the failures occurred. In embodiments, the data 312 can include, but is not limited to, a client device identifier (e.g., user ID, device ID), group identifier, machine identifier (e.g., virtual machine ID), a session identifier, a session count, a failure count, load values, average load index, and/or a time data.

The load values 316 can include load (e.g., current load, active load) of a session 344, a hosted application, a virtual machine 320, and/or group 324 of virtual machines. In some embodiments, the load values 316 can include averages or median load values across a group 324 and the virtual machines 320 forming the group 324. The threshold 314 can include a load level or load limit indicating when a virtual machine 320 and/or application 322 may experience a failure or rejection a request to launch a session 344 to the respective virtual machines 320 and/or hosted application 322. The threshold 314 can include a single value or range of values. The threshold 314 can include a value, integer, or percent. The threshold 314 can include or correspond to a load limit for a session 344, hosted application 322, virtual machine 320, delivery group 324 and/or a load limit for a plurality of sessions 344. The threshold 314 can include a range of load values indicating when an application 322 or machine 320 is approaching a failure 314 (e.g., warning range).

The model (e.g., a failure or performance model) 330 can include a code, script or set of instructions to generate one or more thresholds 314. The model 330 can be implemented using hardware or a combination of software and hardware. The model 330 can include or otherwise apply a machine learning or neural network techniques having one or more layers to process inputs and generate an output corresponding to a threshold 314. For example, the model 330 can apply one or more machine learning and/or artificial intelligence (AI) techniques to generate failure thresholds 314. The device 302 can execute the model 330 to model counts of failures or instances of degraded performance and load data for a hosted application 322, virtual machine 320 and/or group 324. In some embodiments, the inputs to the model 330 can include, but are not limited to, a client device identifier, group identifier, machine identifier, session data, a session count, a failure count, a failure target count, load values 316, average load index, and/or a time data (e.g., sampled time range). In some embodiments, the device 302 can use n-percentiles, minima, and median values of the failure data and/or load data to determine a threshold 314.

The device 302 can connect to or execute a monitoring service 350 within network 340 to monitor one or more sessions 344 between the client devices 370 and hosted applications 322 and virtual machines 320. The monitoring service 350 can include a performance monitoring service or agent. In some instances, the monitoring service 350 can be part of or otherwise implemented by device 302. The monitoring service 350 can perform data collection, aggregation, analysis, management and reporting. In embodiments, the monitoring service 350 can execute transparently (e.g., in the background) to any session 344, hosted application 322, virtual machine 320 and/or client device 370 in the network 340. The monitoring service 350 can monitor, measure, collect, and/or analyze data 312 from client devices, hosted applications 322, virtual machines 320 and/or groups 324 on a periodic basis (e.g., predetermined frequency), based upon an occurrence of given event(s), failure, or in real time during operation of network 340. The monitoring service 350 can monitor resource consumption and/or performance of hardware, software, and/or communications resources of client devices, hosted applications 322, virtual machines 320 and/or groups 324. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored. In embodiments, the monitoring service 350 can be the same as or substantially similar to computer 100 of FIG. 1A and/or server 195 of FIG. 1B. The monitoring service 350 can be implemented using hardware or a combination of software and hardware.

The device 302 can include and maintain a database 352. The database 352 can include, store and maintain data 312, metrics about failures and/or performance, thresholds 314, load values 316, historical data (e.g., historical failure trends, historical load trends), predicted data (e.g., predicted failure trends, predicted load trends), actions 360 and/or recommendations 362. The database 352 can include an entry or table for sessions 344, virtual machines 320, hosted applications 322 and/or groups 324. In embodiments, the device 302 can update and maintain the database 352, for example, in real-time as the load values 316 for sessions 344, virtual machines 320, hosted applications 322 and/or groups 324 are changing. In some embodiments, the database 352 can be organized by time values or time ranges and one or more events and/or one or more failures identified during a particular time value or time range. The database 352 can be the same as or substantially similar to storage device 306.

The device 302 can execute or connect to a provisioning service 354. The provisioning service 354 can include a server or computing device configured to provision or generate one or more virtual machines 320. In embodiments, the provisioning service 354 can transfer or stream configuration data, virtual disk images from a first device or virtual machine to a second device or virtual machine. In some embodiments, the provisioning service 354 can create, deploy, update and/or retire a virtual machine 320, for example, in response to load values 316 of the virtual machine 320 and/or a group 324. The device 302 can request the provisioning service 354 provision a determined number of virtual machines 320, for example, to migrate one or more sessions from existing virtual machines 320 to the provisioned virtual machines 320 or new virtual machines 320 to balance a load across the group 324. In embodiments, the provisioning service 354 can be the same as or substantially similar to computer 100 of FIG. 1A and/or server 195 of FIG. 1B. The provisioning service 354 can be implemented using hardware or a combination of software and hardware.

The device 302 can generate one or more actions 360 and/or one or more recommendations 362. An action 360 can include a step, process or command to correct, address or repair a failure or poor performance and/or load for a session 344, hosted application 322 and/or virtual machine 320. The action 360 can include a script, code, set of instructions or command indicating one or more steps to correct, address or prevent a failure or adjust performance of a particular virtual machine. In embodiments, the action 360 can include a command to migrate a session from one virtual machine 320 to a different virtual machine 320. The action 360 can include a command to modify the assignment of a user and/or client device 370 from one virtual machine 320 to a different virtual machine. The action 360 can include a command, for example, for the provisioning service 354 to provision a virtual machine 320 or create a new virtual machine 320. The action 360 can include a command to add one or more virtual machines 320 to a group 324. The action 360 can include a command to retire, end or power down a virtual machine 320 or move one or more virtual machines 320 from one group 324 to a different group 324. In embodiments, the action 360 can include time value indication when to perform or execute the respective action 360 and/or an identifier for a client device 370, virtual machine 320, hosted application 322 and/or delivery group 324 associated with the action 360.

The device 302 can generate a recommendation 362 indicating or requested performance of an action 360. In some embodiments, an action 360 can be provided or indicated in the form of a recommendation 362 to a server, virtual machine 320, group 324, provisioning service 354 and/or client device 370. The recommendation 362 can include a code, script, set of instructions or command identify one or more actions 360 to correct, address or prevent a failure or adjust performance of one or more virtual machines.

The network 340 can include a public network, such as a wide area network (WAN) or the Internet, a private network such as a local area network (LAN) or a company Intranet, or a combination of a public network and a private network. The network 340 can employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network 340 can include a WiFi network. The network 340 can include a virtual private network (VPN). The VPN can include one or more encrypted sessions 344 between an client device 370, client application 372, virtual machine 320, and/or hosted application 322 over network 340 (e.g., internet, corporate network, private network). In some embodiments, a client device 370, virtual machine 320, and/or hosted application 322 may be on the same network 340. In some embodiments, one or more of a client device 370, virtual machine 320, and/or hosted application 322 may be on different networks 340. The network 34 can be the same or substantially similar to cloud 175 of FIG. 1B.

The sessions 344 can include or correspond to an application session, a browser session, a remote application session, virtual desktop session, virtual application session, and/or web application session. In embodiments, a session 344 can include a virtual desktop session from a client application 372 of an client device 370 to a hosted application 322 of a virtual machine 320 (e.g., virtual machine). The sessions 344 can be established using a communication protocol, including but not limited to, IEEE 202.11 based protocol, Bluetooth based protocol, WiFi based protocol or cellular based protocol. The sessions 344 can include encrypted and/or secure sessions established between a client application 372, an client device 370, a hosted application 322 and/or virtual machine 320. The encrypted session 344 can include an encrypted file, encrypted data or traffic transmitted between a client application 372, an client device 370, a hosted application 322 and/or virtual machine 320.

Figure 4:
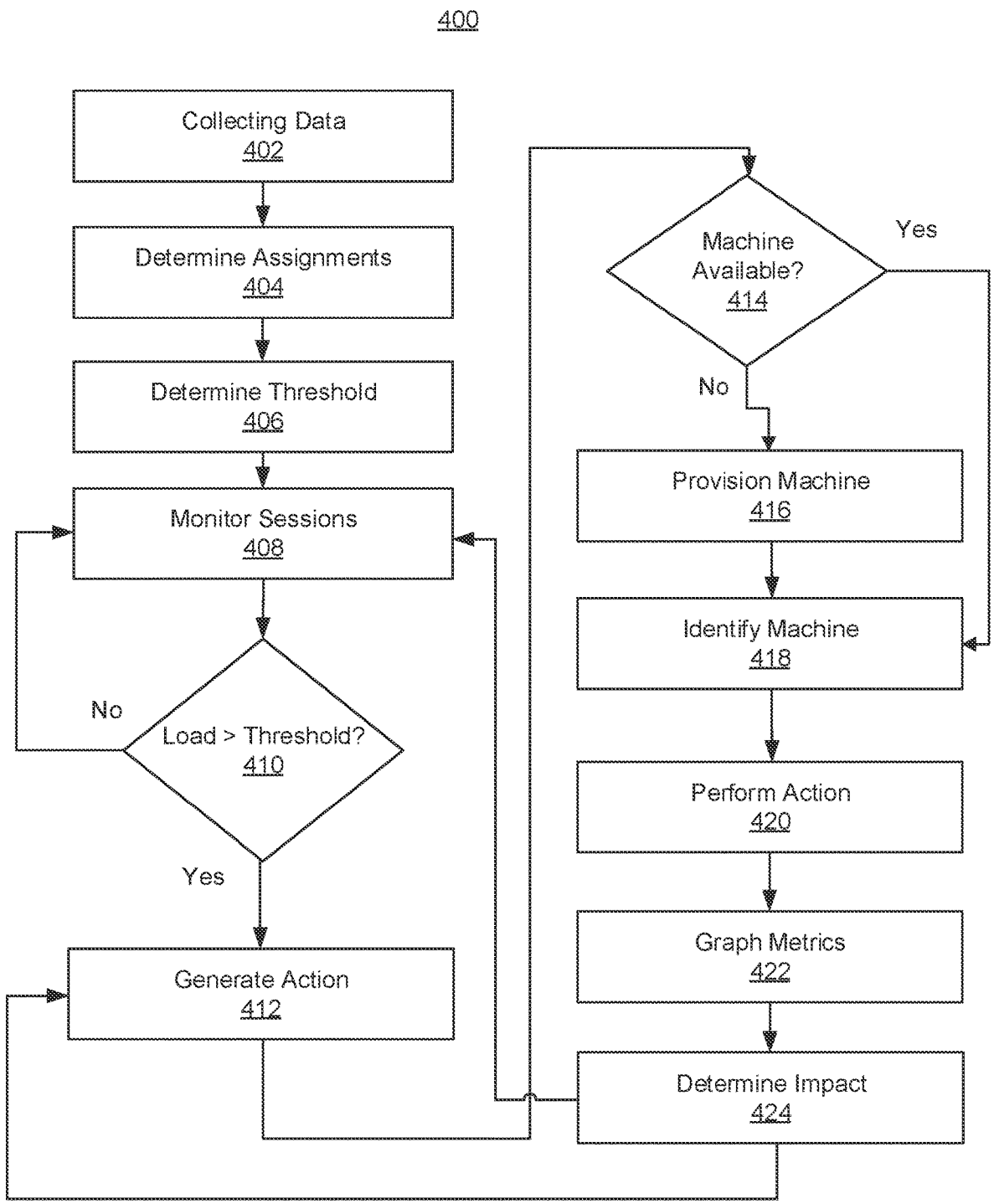
FIG. 4 is a flow diagram of a method for detecting and monitoring failures to virtual machines, in accordance with an illustrative embodiment.

Referring now to FIG. 4, depicted is a flow diagram of one embodiment of a method 400 for determining actions to address or correct application failures. In brief overview, the method 400 can include one or more of: collecting data (402), determining assignments of sessions to virtual machines (404), determining thresholds (406), monitoring sessions (408), identifying if a load value is greater than a threshold (410), generating an action (412), determining if one or more virtual machines are available (414), provisioning a virtual machine (416), identifying a virtual machine (418), performing an action (420), graphing metrics (422), and determining impact of action (424). The functionalities of the method 400 may be implemented using, or performed by, the components detailed herein in connection with FIGS. 1-3.

Now referring to (402), and in some embodiments, data 312 can be collected. A device 302 can collect or receive data 312 from a variety of different sources, including but not limited to, client devices 370, machines 320, and/or applications 322. The data 312 can include client data or customer data associated with one or more previous sessions between client devices 370 and applications 322 and/or machines 320 hosting applications 322. The data 312 can include historical data such as previous failures to one or more applications 322, failures to launch a session to one or more virtual machines 320, time values (e.g., time stamp) associated with the failures, and load values of the virtual machines 320 when the failures occurred. In embodiments, the data 312 can include, but is not limited to, a client device identifier (e.g., user ID, device ID), group identifier, machine identifier (e.g., virtual machine ID), a session identifier, a session count, a failure count, load values, average load index, and/or a time range.

Now referring to (404), and in some embodiments, assignments of sessions to applications 322 can be determined. The device 302 can determine or identify one or more assignments of a user to a virtual machine 320. The assignments can be maintained by the device 302 in a database 352. The assignments can indicate client devices 370 assigned to a group 324 and/or a virtual machine 320. The assignments can indicate one or more sessions 344 from one or client devices 370 to one or more virtual machines 320. The device 302 can perform a lookup for a group 324 in the database 352 to identify the virtual machines 320 in the group 324 and the client devices 370 assigned to the respective virtual machines 320 and/or group 324. In some embodiments, the device 302 can perform a lookup for a virtual machine 320 in the database 352 to identify the client devices 370 assigned to the respective virtual machine 320. In embodiments, the assignment can enable launch of an application 322 with use of the same virtual machine 320 on behalf of the user. The virtual machine 320 can be one of a group 324 of virtual machines 320. The assignments can include or correspond to sessions 244 between client devices 370 and virtual machines 320. The device 302 can determine the number of sessions 344 assigned to one or more applications 322 and/or the number of sessions 344 established with one or more virtual machines 320. The device 302 can determine which applications 322 and/or virtual machine 320 a respective client device 370 is assigned to or connected through a session 344. In embodiments, for sessions 344, the device 370 can determine the client device 370 and application 322 and/or virtual machines 320 connected through the session 344.

Now referring to (406), and in some embodiments, thresholds 314 can be determined. The device 302 can determine a threshold 314 for the virtual machine 320 assigned to the user. The threshold 314 can indicate a likely failure of or performance issue with the virtual machine 320 (e.g., to launch an application 322) based data about performance of the group 324. The device 302 can determine a threshold 314 for a virtual machine 320, a group 324 and/or individual virtual machines 320 in a group 324. The threshold 314 can be generated using data 312 associated with one or more previous failures or instances of degraded performance and/or load values 316 associated with the failures or poor performance. The device 302 can use the historical data 312 for an application 322, virtual machine 320 and/or group 324 to determine at what load values 316 the application 322, virtual machine 320 and/or delivery group 324 experiences issues, errors and/or failures. In embodiments, the device 302 can determine at what load values 316 the application 322 or virtual machine 320 experienced failures, what load values 316 the application 322 or virtual machine 320 rejected request to launch or establish a connection to the application or virtual machine 320, and/or what load values 316 the application 322 or virtual machine 320 experienced delays or latency during one or more sessions 344.

The device can execute a model 330 to generate a threshold 314. The model 330 can apply one or more machine learning and/or artificial intelligence (AI) techniques to generate thresholds 314. The device 302 can execute the model 330 to model counts of failures or instances of degraded performance and load data for an application 322, machine 320 and/or group 324. In some embodiments, the inputs to the model 330 can include, but are not limited to, a client device identifier, group identifier, machine identifier, session data, a session count, a count of failures, a target count for failures, load values 316, average load data, and/or a time data (e.g., sampled time range). In some embodiments, the device 302 can use n-percentiles, minima, and median values of the failure data and/or load data to determine a threshold 314. In embodiments, the device 302 can assign at least one threshold 314 to individual virtual machines 320 of the group 324 of virtual machines 320. The assigned threshold 314 can be based on load levels or load values 316 causing failures during one or more sessions to the respective virtual machine 320.

The threshold 314 can include a value, integer, or percent. The threshold 314 can include or correspond to a load limit for a session 344, for an application 322, a virtual machine 320, group 324 and/or a load limit for a plurality of sessions 344. The threshold 314 can indicate a load limit when an application 322 or virtual machine 320 may fail or otherwise experience degraded or reduced performance if the load limit is exceeded. The threshold 314 can include a range of load values indicating when an application 322 or virtual machine 320 is approaching a threshold 314 (e.g., warning range).

Now referring to (408), and in some embodiments, one or more sessions can be monitored. The device 302 can monitor one or more sessions 344 between client devices 370 and applications 322 or virtual machines 320. The device 302 can use the threshold 314 for an application 322, virtual machine 320 and/or group 324 to monitor the sessions 344 and detect or prevent a failure from occurring or address degraded performance of one or a group of virtual machines. In embodiments, the device 302 can actively monitor, for example, in real-time the load values of the sessions 344 and at the applications 322 or virtual machines 320 to detect which applications 322 or virtual machines 320 are maintaining a load value 316 less than the threshold 314 and/or which applications 322 or virtual machines 320 may be approaching the threshold 314, and/or which applications 322 or virtual machines 320 may have exceeded the thresholds 314. The device 302 can continually update and monitor the load values 316 of the sessions 344 to determine if one or more sessions 344 can be migrated to improve a performance the sessions (e.g., delay issues, latency issues), correct a failure or prevent a failure. In embodiments, a load value 316 can be compared to a threshold 314 at determined intervals or continually. In some embodiments, the device 302 can include a notification service to generate a notification to the device 302 to indicate when a load value 316 for a session 344 is within a determined range of a threshold 314 or has exceeded a threshold 314.

In embodiments, the device 302 can use or execute model 330 to monitor an active load 316 (e.g., real-time load values 316) on virtual machines 320 in the group 324. The model 330 can model the load values 316 of the virtual machines 320 to generate a predicted load trend for the virtual machines 320. The model 330 can dynamically or in real-time detect when a virtual machine 320 may experience a failure due to loading. In some embodiments, the device 302, using the output from the model 330, can modify or dynamically modify the threshold 314 based in part on detected subsequent failures for one or more virtual machines 320 in the group 324 and detected active load associated with the failures. The model 330 can increase or decrease the threshold 314 based in part on the detected load values 316 associated with the failures.

Now referring to (410), and in some embodiments, a determination can be made if a load value is greater than a threshold. The device 302 can compare one or more load values 316 for virtual machines 320 in the group 324 to a threshold 314 for the group or the device 302 can compare load values 316 for the virtual machines 320 to individual thresholds 314 generated for the respective virtual machine 320. If the load values 316 are less than the threshold 314, the method 400 can go to (408) to continue monitoring the sessions 344. In some embodiments, the device 302 can identify or determine that a load value 316 of a virtual machine 320 is greater than the threshold 314. The virtual machine 320 and/or an application 322 provided by the virtual machine 320 can host one or more sessions 344 to one or more client devices 370. The device 302 can compare the load value 316 (e.g., current load value, load value over a determined time period) to the failure 314 and identify that the load value 316 is within a determined range of the threshold 314 or exceeded the threshold 314. The load value 316 can include a load for one session 344 to the virtual machine 320 or total load for a plurality of sessions 344 to the virtual machine 320. The device 302 can determine the client device 370 or client devices 370 associated with the session 344 and/or sessions 344 and impacted by the load value 316. If a load value 316 for a virtual machines is greater than the threshold 314, the method 400 can go to (412) to generate an action 360.

Now referring to (412), and in some embodiments, an action can be generated. The device 302 can generate, using the threshold 314, one or more actions 360 (e.g., to transfer or migrate one or more sessions 344 to one or more different virtual machines of the plurality of virtual machines 320 of the group 324) responsive to the current load value 316 for the respective virtual machine 320. The action 360 can include a fix, process or recommendation 362 to correct or prevent a failure or otherwise address degraded or reduced performance of a virtual machine. For example, the device 302 can determine that a session 344 should be migrated from a first virtual machine 320 to a second virtual machine based in part on the load value 316 to the first virtual machine 320 being near, at or exceeding the threshold and the load value 316 of the second virtual machine 320 being less than the threshold 314. The action 360 can include a code, script, command or set of instructions indicating to move a session 344 or multiple sessions 344 to one or more different virtual machines 320 based on the load values 316 of the virtual machines 320 and/or current sessions 344 to the virtual machines 320. The action 360 can include modifying or changing the assignment of a user from a first virtual machine 320 to a second virtual machine 320, for example, based on a comparison of a load 316 on the virtual machines 320 and the threshold 314, so as to avoid failure of an application 322 to launch via the virtual machine 320. In some embodiments, the action 360 can indicate the virtual machine 320 and/or application 322 to move the session 344 to, a time value of when to move the session and the virtual machine and/or application 322 the session 344 is being moved from.

Now referring to (414), and in some embodiments, a determination can be made if a virtual machine 320 is available to transfer the session 344 or assignment to. The device 302 can determine load values 316 for the virtual machines 320 in the group 324, for example, in the same group 324 as the highly loaded or overloaded virtual machine 320. The device 302 filter the virtual machines 320 into subsets including a first subset of virtual machines 320 having load values 316 less than the threshold 314 or predicted to have load values 316 less than the threshold 314 over a time period (e.g., future, time period, session time period) and a second subset of virtual machines 320 having load values 316 greater than the threshold 314 or predicted to have load values 316 greater than the threshold 314 over a time period (e.g., future time period, session time period).

In some embodiments, the device 302 can determine that none of the virtual machines 320 in the group 324 have a load value 316 less than the threshold 314, that the virtual machines 320 in the delivery group 324 are to close or within a determined value range of the threshold 314 (e.g., session 244 may cause virtual machines 320 to exceed threshold), or that each of the virtual machines 320 are predicted to reach or exceed the threshold 314 over a time period corresponding to a length of the session 344 to be migrated. The method 400 can go to (416) to provision, add or generate a new virtual machine 320 for the group 324. In some embodiments, if the device 302 determines one or more virtual machines 320 are available to receive the session 344 and/or assignment of the user and have load values 316 less than the threshold 314, the method 400 can go to (418) to identify a virtual machine 320 available to host the session.

Now referring to (416), and in some embodiments, a virtual machine can be provisioned or generated. The device 302 can determine that no virtual machines 320 in the group 324 are available to receive a new session or new assignment and can connect to or execute a provisioning service 354. The provisioning service 354 can provision or generate a virtual machine 320 or multiple virtual machines 320 to migrate one or more sessions 344 and/or balance the load across the virtual machines 320 of the group 324. In embodiments, the device 302 can generate, using the provisioning service 354, a new virtual machine 320 or multiple virtual machines 320 responsive to each virtual machine 320 of the group 324 of virtual machines 320 having the load 316 greater than the threshold 314. The new virtual machine 320 or multiple virtual machines 320 can be added to the group 324 of virtual machines 320.

Now referring to (418), and in some embodiments, a virtual machine can be identified to move or receive the session. The device 302 can determine or select a virtual machine 320 to transfer the assignment and/or move the session 344 to, for example, from a first virtual machine 320 having a load value 316 greater than the threshold 314. The selected virtual machine 320 can include a virtual machine in the group 324 having a load value 3216 less than the threshold 314 or a new provisioned or added virtual machine 320, added to the group 324. The device 302 can determine the load values 316 for the virtual machines 320 in the same group 324 as the first virtual machine 320. The device 302 can select at least one virtual machine 320 from a filtered second subset of virtual machines 320 having load values 316 less than the threshold 314. In embodiments, the device 302 can select the virtual machine 320 in the group 324 having the lowest load value 316 or a load value 316 in a target load range. In some embodiments, the device 302 can select the virtual machine 320 in the group 324 predicted to have the lowest load value 316 over a determined time period (e.g., session time period, session length).

Now referring to (420), and in some embodiments, an action can be performed. The device 302 can perform an action 360 to correct or fix the issue causing the failure. In some embodiments, the action 360 can include migrating or transferring a session 344 from a first virtual machine 320 (e.g., highly loaded first virtual machine) to a second virtual machine 320 having a load value 316 less than the threshold 314. The device 302 can modify the assignment of a user from the first virtual machine 320 to the second virtual machine 320 of the delivery group 324 based on a comparison of a load 316 on the virtual machines 320 and the threshold 314. The session 344 can be migrated from the virtual machine 320 having a load value 316 near or greater than the threshold 314 to the selected virtual machine 320 in the same delivery group 324. The device 302 can transmit a request or command to the selected virtual machine 320 notifying the selected virtual machine 320 of the migration and configuration data and/or memory state of the session 344 can be migrated or transferred to the selected virtual machine 320. In embodiments, the device 302 can transmit a signal or notification to the selected virtual machine 320 and the original virtual machine 320 to indicate that the migration was successful.

In some embodiments, the device 302 can transfer or migrate the session 344 to a new or provisioned virtual machine 320. The device 302 can determine that a new virtual machine 320 was provisioned or determine that a new virtual machine 320 was added to the delivery group 324 and can transmit a request or command to the new virtual machine 320 notifying the virtual machine 320 of the migration. The configuration data and/or memory state of the session 344 can be migrated or transferred to the new virtual machine 320 from the original virtual machine 320. In embodiments, the device 302 can transmit a signal or notification to the new virtual machine 320 and the original virtual machine 320 to indicate that the migration was successful.

Now referring to (422), and in some embodiment, metrics can be graphed. The device 302 can determine metrics associated with the action 360, the sessions 344, virtual machines 320, applications 322 and/or group 324. The metrics can include, but are not limited to, load values 316, thresholds 314, current trends (e.g., active current load over a time period), predicted trends (e.g., predicted load over a time period), metrics, and a number of failures. The device 302 can graph, plot or display the metrics through an interface of the device 302 and/or a client device 370 to illustrate a current trend or predicted trend for sessions 344 to virtual machines 320 and/or applications 322. The graphs can include a plot comparison of historical data (e.g., load data, failure data) for a previous time period to a predicted and/or current trend of data (e.g., load values, failure data) for one or more virtual machines 320 and/or applications 322. The device 302 can graph a number of failures for a virtual machine 320, an application 322 and/or group 324 and load values 316 associated with the failures or a load value 316 when the failure occurred.

In embodiments, the device 302 can generate a graph to show or compare a performance of one or more virtual machines 320 before an action 360 (e.g., migrate sessions) is performed and a performance of the one or more virtual machines 320 after the action 360 is performed, for example, to determine an impact or effectiveness of the action 360. The device can generate a graph having historical data (e.g., load data, failure data) for a previous time period prior to the action 360 being performed and the predicted and/or current trend of data (e.g., load values, failure data) for one or more virtual machines 320 after the action 360 was performed. The device 302 can generate an indication in the plot to show when or at what time point an action 360 was performed to illustrate an impact or lack of impact of an action 360 (e.g., migration of a session). In embodiments, the device 302 can display a number of failures experienced over a determined time period, for a group 324 and/or for a particular group of client devices 370 or users. The device 302 can display the or group the virtual machines 320 having load greater than a threshold 314 and virtual machines 320 having load less than a threshold 314 to notify or alert the device 302 and/or an administrator where to migrate sessions 344 between applications 322. For example, the device 302 can generate, responsive to the load 316 of the virtual machine 320 exceeding the threshold 314, a notification indicating a potential failure or degraded performance for at least one session to the virtual machine 320. The notification can be displayed through an interface of the device 302 and/or transmitted to a client device 370 for display. The device 302 can graph or display the metrics through an interface (e.g., user interface 125 of FIG. 1, GUI 150 of FIG. 1) of the device 302 and/or a client device 370 to show and display the metrics, load values 316, threshold 314, current trends and predicted trends to user and/or administrator.

In embodiments, the device 302 can graph the load values 316 for the virtual machines 320 in real-time and include a threshold 314 to provide or enable active monitoring of sessions 344 to virtual machines 320. The graph can indicate when a virtual machine 320 is approaching a threshold 314, within a critical range of a threshold 314 and/or exceeds a threshold 314 for the device 302 to implement or perform an action 360 to address the issues causing or leading to a failure or reduced performance for the virtual machine 320. In embodiments, the graph can indicate or highlight (e.g., display more prominently, different font size) virtual machines 320 having load values 316 less than a threshold 314 and recommend virtual machines 320 to migrate a session 344 from a highly loaded virtual machine 320 or a virtual machine 320 having a load value 316 near or greater than the threshold 314.

Now referring to (424), and in some embodiments, an effectiveness of the action can be determined. The device 302 can collect and record metrics of the virtual machines 320 before and after migrating one or more sessions to determine an effectiveness or impact of an action 360 to migrate a session 344 in a group 324. Metrics can include load values 316, performance ratings, and detected failures. The device 302 can use the metrics to determine an action 360 (e.g., migration) to correct the failure, improve performance of one or more virtual machines 320 in the group 324 and/or improve user experience at a client device 370. The actions 360 can include migrating one or more sessions 344, provisioning a new virtual machine 320, removing a virtual machine 320 from a group 324, powering down a virtual machine 320 and/or balancing load across a plurality of virtual machines 320 in a group 324. The device 302 can compare the load values 316 for the virtual machines 320 in the delivery group 324 prior to the action to the load values 316 for the virtual machines 320 after the action has been taken to determine if the one or more virtual machines 320 still have load values 316 greater than the threshold 314. An average load value for the virtual machines 320 over a determined time period can be determined after the action has been taken and compare to the average load value 316 for the virtual machines 320 over a similar time period (e.g., same time length, one day, one week) to determine an effectiveness of the action.

In some embodiments, the device 302 can determine a current trend or predicted trend for one or more virtual machines 320 in the group 324 to determine if the virtual machines 320 are maintaining load values 316 less than the threshold 314 or if a trend shows a load value 316 for one or more applications 322 may approach or exceed the threshold 314 at some point in the future. The predicted trends can be used as baseline values to determine the effectiveness or impact of an action 360 or fix. The predicted trend can indicate expected load values 316 and/or failure or performance trends after an action 360 is performed. The device 302 can determine, responsive to performing an action 360 (e.g., when a fix is applied, session migration), the predicted load values 316 and failure or performance trends for a next time period (e.g., data for the next day) and use the predicted load values 316 and failure or performance trends for the next time period as a baseline to determine how the action 360 is impacting performance of the virtual machine 320 in the group 324. For example, responsive to migrating a session 344, for the next time period, the active load values 316 and active or current failure trend can be compared against the baseline or predicted trend to determine how the effectiveness of the action 360 (e.g., whether load values match, whether current failure trend matches, is less than or exceeds the predicted trend). The device 302 can use the comparison to change or modify a future or subsequent action 360 and/or threshold 314. For example, if the device 302 determines an action 360 was not effective or didn't reduce load values 316 as predicted, the device 302 can modify the action 360 to include migrating additional sessions 344 in a next time period. In embodiments, if the device 302 determines an action 360 was not effective or didn't reduce load values 316 as predicted, the device 302 can modify the threshold 314 such that a migration of one or more sessions 344 occurs at lower load values 316 to address the failure or issues at an earlier stage or point in time. The device 302 can store and record an effectiveness of one or more actions 360 to determine whether to apply the same or similar actions 360 in the future.

In some embodiments, the device 302 can compare load values 316 for a first failure or instance of degraded performance associated with the virtual machine 320 and load values 316 for a second failure or instance of poor performance associated with the virtual machine 320 and modify the threshold 314 for the virtual machine 320. The device 302 can determine that the threshold 314 was not accurate or did not prevent failures or remedy performance issues of the virtual machine 320 (e.g., a failure to launch applications 322 via the virtual machine 320). In embodiments, the device 302 may determine the threshold 314 was too strict or can be increased as the load values 316 associated with the failures or performance problems were greater than the threshold 314 such that the value of the threshold 314 can be increased and still prevent failures or issues with performance. The device 302 can change the value of the threshold 314 (e.g., decrease, increase) to prevent a subsequent failure at or reduced performance of the virtual machine 320.

In embodiments, if the load values 316 for the virtual machines 320 are below the threshold 314 and load trends (e.g., current, predicted) for the virtual machine 320 do not show or indicate the one or more virtual machines 320 may exceed the threshold 314, the method 400 can move to (408) to continue monitoring one or more sessions 344 to the virtual machines 320 in the group 324. In embodiments, if the load values 316 for one or more virtual machines 320 are near or exceeding the threshold 314 or if load trends (e.g., current, predicted) for one or more virtual machines 320 show or indicate the one or more virtual machines 320 may exceed the threshold 314, the method 400 can move to (412) to generate an action 360 to address the highly loaded virtual machines 320 in the group 324.

Figure 5:
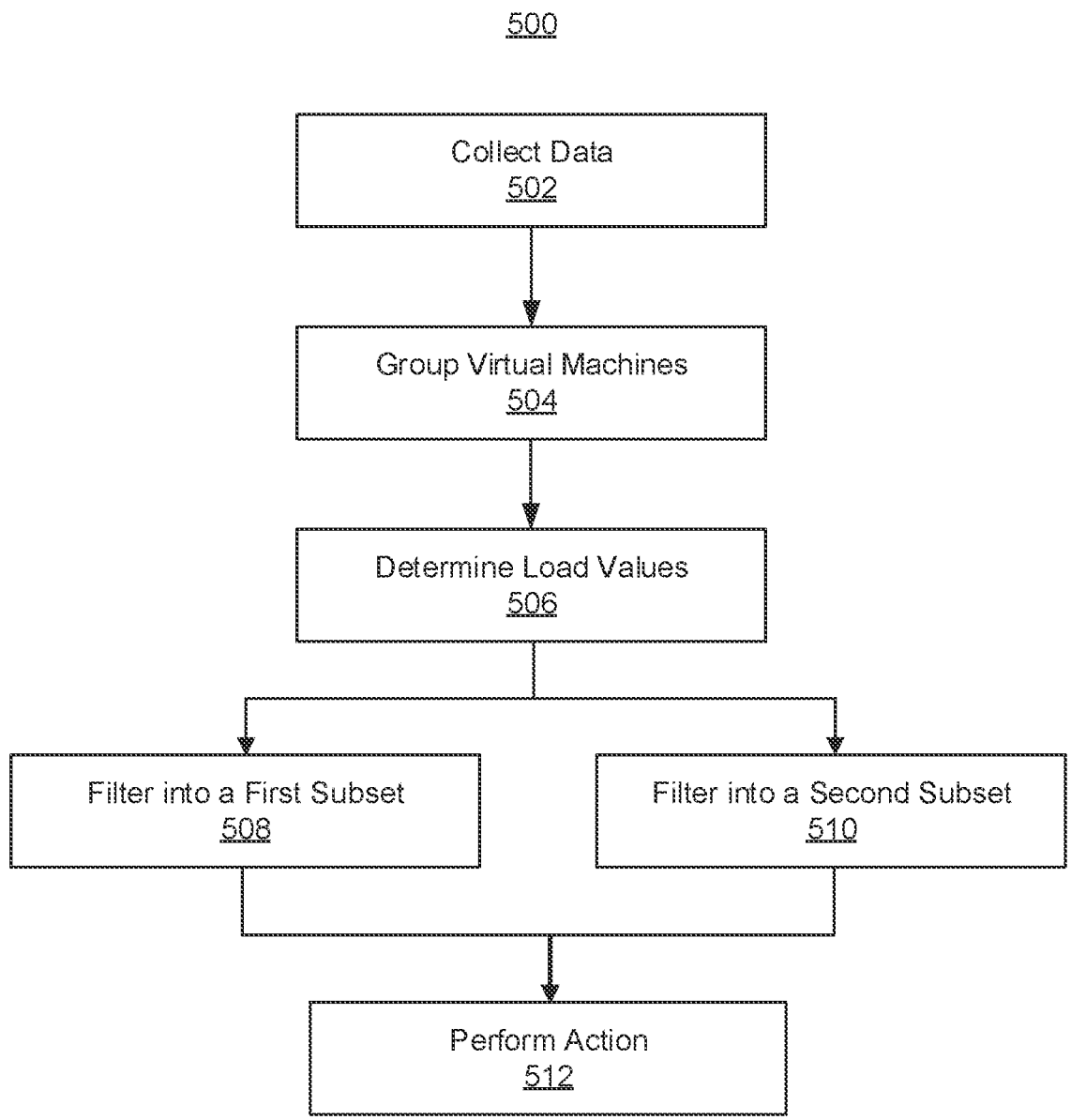
FIG. 5 is a flow diagram of a method for filtering and monitoring virtual machines is provided, in accordance with an illustrative embodiment.

Now referring to FIG. 5, a method 500 for filtering and monitoring virtual machines is provided. In brief overview, the method 500 can include one or more of: collecting data (502), grouping virtual machines (504), determining a load values (506), filtering virtual into a first subset (508), filtering virtual into a second subset (510), and performing one or more actions (512). The functionalities of the method 500 may be implemented using, or performed by, the components detailed herein in connection with FIGS. 1-3.

Now referring to (502), and in some embodiments, data can be collected. A device 302 can collect data 312 associated with sessions 344 to virtual machines 320. The device 302 can determine the assignments of users and/or client devices 370 to virtual machines 320 and hosted applications 322. The data 312 can include load values 316 for the sessions 344, load values 316 of the virtual machines 320 and/or load values 316 for the hosted applications 322.

Now referring to (504), and in some embodiments, virtual machines can be grouped. For example, the device 302 can group the virtual machines 320 into a group 324, such as a delivery group. The device 302 can assign or group the virtual machines 320 into one or more groups 324 based in part on the users and/or client devices 370 assigned to the respective virtual machines 320. The groups 324 can include or authorize a group of users and/or client devices 370 to access the virtual machines 320 and hosted applications 322 assigned to the group 324.

Now referring to (506), and in some embodiments, a load value can be determined. The device 302 can determine a load value 316 or median load value at which a session launch failed or otherwise experienced degraded performance across virtual machines 320 of the group 324. The device 302 can use the data 312 to determine a load value 316 at which a virtual machine 320 experienced a session failure or degraded performance (e.g., rejection of launch requests from client devices 370 to launch a session 344 to the respective virtual machine 320). In embodiments, the device 302 can determine an average load value 316 at which failure or degraded performance occurred for the group 324 based on the load values 316 for the virtual machines 320 of the group 324. In some embodiments, the device 302 can determine a load value 316 for individual virtual machines 320 in the group 324. The device 302 can generate a threshold 314 that is associated with the load value 316 at which failure or degraded performance of the virtual machine occurred. In embodiments, the device 302 can set the threshold 314 to be the same value as the average of the load values at which failure or poor performance occurred for the group 324. The device 302 can set the threshold 314 to be a percentage of the average of the load values 316 of the group 324 at which failure or degraded performance occurred. In some embodiments, the threshold 314 can include a value or range before the load value 316 and can be implemented, for example, to prevent a failure or poor performance and prevent a load value 316 at a virtual machine 320 from reaching the load value 316 at which failure or reduced performance occurs. In embodiments, the device 302 can set the threshold 314 to be the same value or less than the individual load values 316 of the individual virtual machines 320 at which failure or reduced performance occurs.

Now referring to (508), and in some embodiments, virtual machines having a load value greater than a threshold can be filtered into a first subset. The device 302 can filter or group the virtual machines 320 having a load value 316 (e.g., current load value, predicted load value) at or greater than the threshold 314. The device 302 can compare the load values 316 for the virtual machines 320 and group the virtual machines 320 having load values 316 at or greater than the threshold 314 in the first subset and tag one or more sessions 344 to the virtual machines 320 for action (e.g., migration).

Now referring to (510), and in some embodiments, virtual machines having a load value less than the threshold can be filtered into a second subset. The device 302 can filter or group the virtual machines 320 having a load value 316 (e.g., current load value, predicted load value) less than the threshold 314. The device 302 can compare the load values 316 for the virtual machines 320 and group the virtual machines 320 having load values 316 less than the threshold 314 in the second subset. The second subset can indicate virtual machines 320 available to receive one or more additional sessions 344, for example, from virtual machines 320 in the first subset.

Now referring to (512), and in some embodiments, one or more actions can be performed. The device 302 can perform one or more actions 360 to address failures and/or balance load across the virtual machines 320 in the first subset and the second subset. In embodiments, the actions 360 can include migrating or transferring one or more sessions 344 from virtual machines 320 in the first subset (e.g., highly loaded virtual machines) to virtual machines 320 in the second subset. The device 302 can modify the assignment of one or more users and/or client devices 370 from one or more the virtual machines 320 in the first subset to one or more virtual machines 320 in the second subset.

The number of sessions 344 migrated or re-assigned can be based in part on the load values 316 of the virtual machines 320 in the first subset and/or an amount of load to be moved to reduce the load values 316 at the virtual machines 320 to be less than the threshold 314. The device 302 can select a number of sessions 344 to the virtual machines 320 to be migrated, for example, to balance the load across the delivery group 324. The sessions 344 can be migrated from the virtual machines 320 in the first subset to the virtual machines 320 in the second subset. The device 302 can determine load values 316 for virtual machines 320 in both the first and second subsets to determine an impact or effectiveness of the action 360 to migrate the sessions 344. The device 302 can continue to monitor the load values 316 of the group 324 and the virtual machines 320 in the delivery group 324. If a failure to launch a session occurs and/or if the load value 316 of one or more virtual machines 320 nears or reaches the threshold 314, the method 500 can return to (506) to verify the threshold 314 and, if needed, filter the virtual machines 320 into subsets.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method comprising:
   identifying, by a computing device, an assignment of a user to a virtual machine, the assignment enables launch of an application with use of the same virtual machine on behalf of the user, and the virtual machine being one of a group of virtual machines;
   determining, by the computing device, a threshold for a load level for the virtual machine, the threshold being indicative of likely failure of the virtual machine to launch the application based on historical data about performance and load levels of each virtual machine of the group of virtual machines launching the application;
   modifying, by the computing device, the assignment of a user from the virtual machine to another virtual machine of the group based on a comparison of a load on the virtual machine and the determined threshold, so as to avoid failure of the application to launch;
   transferring, by the computing device, the assignment of one or more sessions to the another virtual machine of the group of virtual machines to cause the another virtual machine to launch the application; and
   launching, by the another virtual machine, the one or more sessions.

2. The method of claim 1, comprising:
   assigning, by the computing device, at least one threshold to each virtual machine of the group of virtual machines, the at least one threshold based on load levels causing failures during one or more sessions to the respective virtual machine.

3. The method of claim 1, comprising:
generating, by the computing device responsive to the load of the virtual machine exceeding the threshold, a notification indicating a potential failure for at least one session to the virtual machine, the threshold indicating a load limit for the virtual machine.

4. The method of claim 1, comprising:
comparing, by the computing device, load values for a first failure associated with the virtual machine and load values for a second failure associated with the virtual machine; and
modifying, by the computing device responsive to the comparison, the threshold for the virtual machine.

5. The method of claim 1, comprising:
determining, by the computing device responsive to a failure for a session to the another virtual machine, each virtual machine of the group of virtual machines having a load greater than the threshold;
generating, by the computing device, a new virtual machine responsive to each virtual machine of the group of virtual machines having the load greater than the threshold, the new virtual machine added to the group of virtual machines; and
transferring, by the computing device, the assignment of the user from the another virtual machine to the new virtual machine.

6. The method of claim 1, comprising:
monitoring, by the computing device using a failure model, an active load on each virtual machine of the group of virtual machines, wherein the failure model dynamically modifies the threshold responsive to subsequent failures associated with a respective virtual machine and the active load associated with the subsequent failures.

7. The method of claim 1, comprising:
determining, by the computing device for a plurality of sessions between a plurality of client devices and a plurality of virtual machines of the group of virtual machines, a current load for each of the plurality of virtual machines; and
generating, by the computing device using the threshold, one or more actions to modify the assignment of one or more sessions to one or more different virtual machines of the plurality of virtual machines responsive to the current load for the respective virtual machines.

8. The method of claim 7, comprising:
generating, by the computing device responsive to the one or more actions, one or more virtual machines to add to the group of virtual machines; and
transferring, by the computing device, the assignment of the one or more sessions to the one or more virtual machines generated for the group of virtual machines.

9. The method of claim 1, comprising:
determining, by the computing device for a subset of the group of virtual machines, an average of load values for virtual machines in the subset, the load values associated with one or more failures at the virtual machines.

10. The method of claim 9, comprising:
determining, by the computing device, one or more virtual machines in the subset having a load greater than the average of the load values for the subset; and
transferring, by the computing device, the assignment of one or more sessions from the one or more virtual machines to other virtual machines in the subset having a load less than the average of the load values for the subset.

11. A system comprising:
one or more processors coupled to memory, the one or more processors configured to:
identify an assignment of a user to a virtual machine, the assignment enables launch of an application with use of the same virtual machine on behalf of the user, and the virtual machine being one of a group of virtual machines;
determine a threshold for a load level for the virtual machine, the threshold being indicative of likely failure of the virtual machine to launch the application based on historical data about performance and load levels of each virtual machine of the group of virtual machines launching the application;
modify the assignment of a user from the virtual machine to another virtual machine of the delivery group based on a comparison of a load on the virtual machine and the determined threshold, so as to avoid failure of the application to launch;
transfer the assignment of one or more sessions to the another virtual machine of the group of virtual machines to cause the another virtual machine to launch the application; and
launch, by the another virtual machine, the one or more sessions.

12. The system of claim 11, wherein the one or more processors are configured to:
compare load values for a first failure associated with the virtual machine and load values for a second failure associated with the virtual machine; and
modify, responsive to the comparison, the threshold for the virtual machine.

13. The system of claim 11, wherein the one or more processors are configured to:
determine, responsive to a failure for a session to the another virtual machine, each virtual machine of the group of virtual machines having a load greater than the threshold;
generate a new virtual machine responsive to each virtual machine of the delivery group of virtual machines having the load greater than the threshold, the new virtual machine added to the group of virtual machines; and
transfer the assignment of the user from the another virtual machine to the new virtual machine.

14. The system of claim 11, wherein the one or more processors are configured to:
monitor, using a failure model, an active load on each virtual machine of the group of virtual machines, wherein the failure model dynamically modifies the threshold responsive to subsequent failures associated with a respective virtual machine and the active load associated with the subsequent failures.

15. The system of claim 11, wherein the one or more processors are configured to:
determine, for a plurality of sessions between a plurality of client devices and a plurality of virtual machines of the group of virtual machines, a current load for each of the plurality of virtual machines; and
generate, using the threshold, one or more actions to modify the assignment of one or more sessions to one or more different virtual machines of the plurality of virtual machines responsive to the current load for the respective virtual machines.

16. The system of claim 15, wherein the one or more processors are configured to:
- generate, responsive to the one or more actions, one or more virtual machines to add to the group of virtual machines; and
- transfer the assignment of the one or more sessions to the one or more virtual machines generated for the group of virtual machines.

17. The system of claim 11, wherein the one or more processors are configured to:
- determine, for a subset of the group of virtual machines, an average of load values for virtual machines in the subset, the load values associated with one or more failures at the virtual machines;
- determine one or more virtual machines in the subset having a load greater than the average of the load values for the subset; and
- transfer the assignment of one or more sessions from the one or more virtual machines to other virtual machines in the subset having a load less than the average of the load values for the subset.

18. A non-transitory computer-readable medium, comprising instructions that, when executed by one or more processors, cause the one or more processors to:
- identify an assignment of a user to a virtual machine, the assignment enables launch of an application with use of the same virtual machine on behalf of the user, and the virtual machine being one of a group of virtual machines;
- determine a threshold for a load level for the virtual machine, the threshold being indicative of likely failure of the virtual machine to launch the application based on historical data about performance and load levels of each virtual machine of the group of virtual machines launching the application;
- modify the assignment of a user from the virtual machine to another virtual machine of the delivery group based on a comparison of a load on the virtual machine and the determined threshold, so as to avoid failure of the application to launch;
- transfer the assignment of one or more sessions to the another virtual machine of the group of virtual machines to cause the another virtual machine to launch the application; and
- launch, by the another virtual machine, the one or more sessions.

19. The computer-readable medium of claim 18, further comprising instructions that cause the one or more processors to:
- determine, responsive to a failure for a session to the another virtual machine, each virtual machine of the group of virtual machines having a load greater than the threshold;
- generate a new virtual machine responsive to each virtual machine of the group of virtual machines having the load greater than the threshold, the new virtual machine added to the group of virtual machines; and
- transfer the assignment of the user from the another virtual machine to the new virtual machine.

20. The computer-readable medium of claim 18, further comprising instructions that cause the one or more processors to:
- determine, for a subset of the group of virtual machines, an average of load values for virtual machines in the subset, the load values associated with one or more failures at the virtual machines;
- determine one or more virtual machines in the subset having a load greater than the average of the load values for the subset; and
- transfer the assignment of one or more sessions from the one or more virtual machines to other virtual machines in the subset having a load less than the average of the load values for the subset.

* * * * *